(12) United States Patent
Zhang et al.

(10) Patent No.: US 11,711,160 B2
(45) Date of Patent: Jul. 25, 2023

(54) TRANSMISSION DEVICE AND TRANSMISSION SYSTEM

(71) Applicant: FUJITSU LIMITED, Kawasaki (JP)

(72) Inventors: Xiang Zhang, Yokohama (JP); Kyosuke Sone, Kawasaki (JP); Tatsuya Tsuzuki, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 17/544,975

(22) Filed: Dec. 8, 2021

(65) Prior Publication Data

US 2022/0303038 A1 Sep. 22, 2022

(30) Foreign Application Priority Data

Mar. 19, 2021 (JP) .................. 2021-045383

(51) Int. Cl.
*H04J 14/02* (2006.01)
*H04B 10/079* (2013.01)

(52) U.S. Cl.
CPC .... *H04J 14/0221* (2013.01); *H04B 10/07955* (2013.01)

(58) Field of Classification Search
CPC ........ H04J 14/0221; H04J 14/02; H04J 14/00; H04J 14/0265; H04J 14/026; H04J 14/0278; H04B 10/0795; H04B 10/07955; H04B 10/50; H04B 10/40; H04B 10/2942; H04B 10/564; H04B 10/07953; H04Q 2011/0016

USPC .......................... 398/94, 93, 92, 38
See application file for complete search history.

(56) References Cited

U.S. PATENT DOCUMENTS

| | | | |
|---|---|---|---|
| 6,512,628 B1 | 1/2003 | Terahara et al. | |
| 2004/0080812 A1 | 4/2004 | Sugaya et al. | |
| 2011/0058821 A1* | 3/2011 | Goto ................... | H04B 10/2931 398/195 |
| 2016/0079730 A1* | 3/2016 | Teranishi .............. | H01S 5/0683 359/344 |

FOREIGN PATENT DOCUMENTS

| | | |
|---|---|---|
| JP | 2001-251006 A | 9/2001 |
| JP | 2004-061647 A | 2/2004 |
| JP | 2007-025510 A | 2/2007 |
| JP | 2011-059424 A | 3/2011 |

* cited by examiner

*Primary Examiner* — Hibret A Woldekidan
(74) *Attorney, Agent, or Firm* — Fujitsu Patent Center

(57) ABSTRACT

A transmission device including: a signal power detection circuit that detects signal power of a wavelength-division-multiplexed optical signal to be transmitted to a transmission line into which pumping light is inputted from a Raman amplifier; a variable optical attenuator that attenuates the wavelength-division-multiplexed optical signal; and a control circuit that reduces an attenuation amount of the variable optical attenuator depending on an increase in the signal power.

14 Claims, 21 Drawing Sheets

FIG. 2
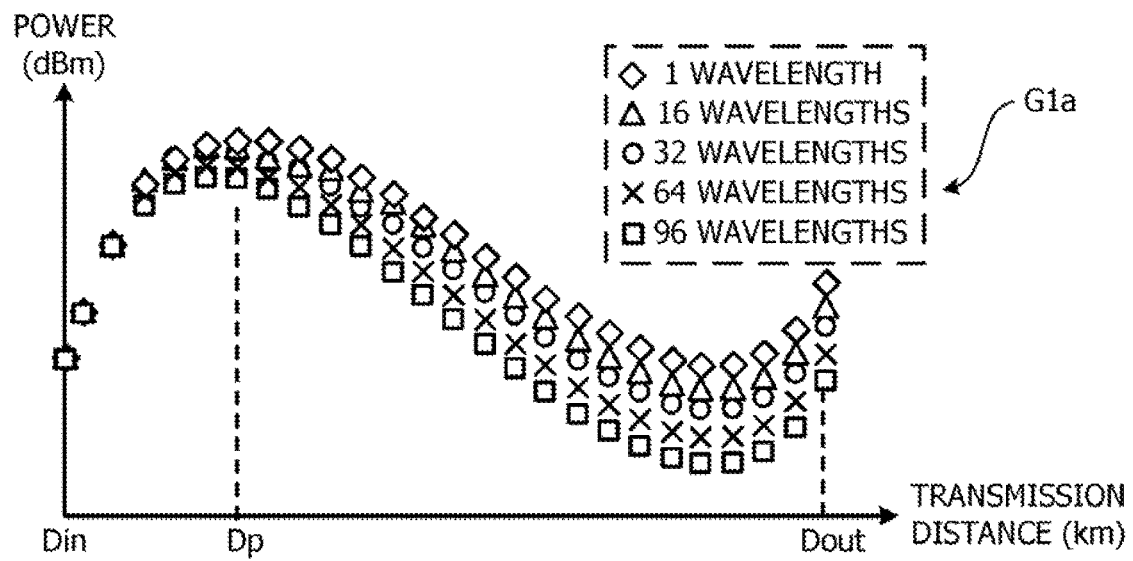
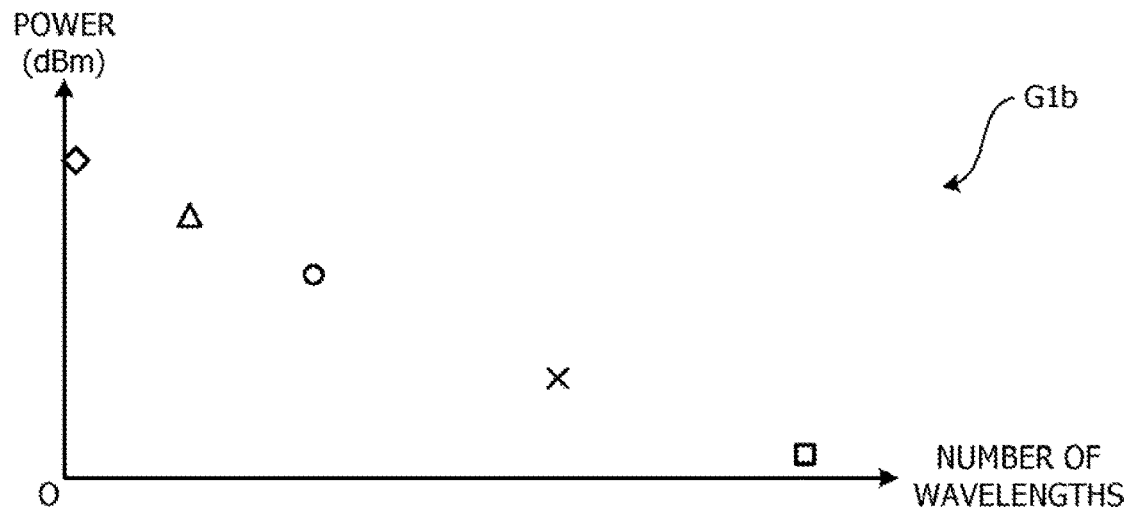
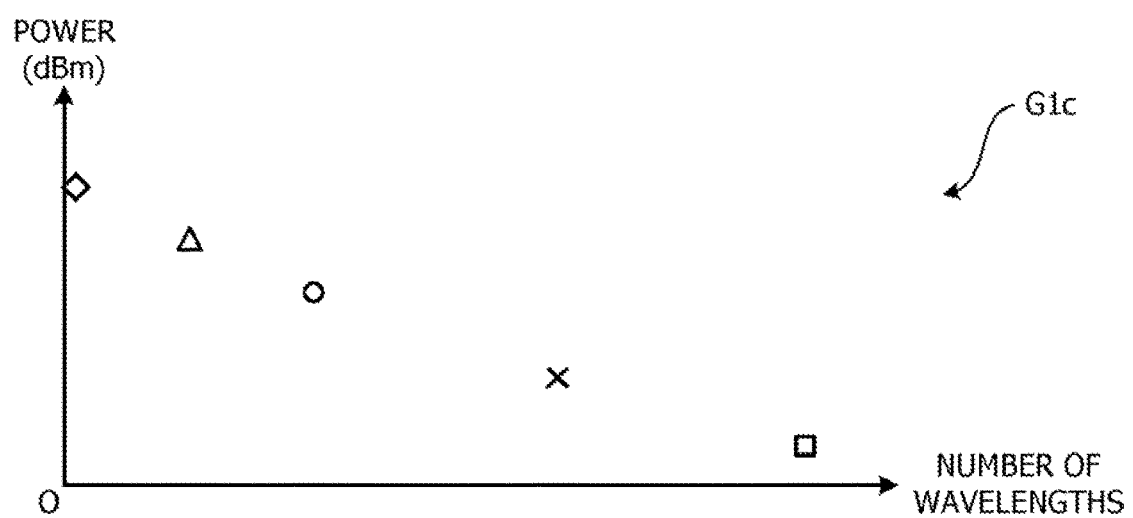

FIG. 10

| NUMBER OF WAVELENGTHS | SIGNAL POWER (mW) | TYPE OF OPTICAL FIBER | | |
|---|---|---|---|---|
| | | SMF | DSF | ExtCORE |
| | | ATTENUATION AMOUNT (dB) | ATTENUATION AMOUNT (dB) | ATTENUATION AMOUNT (dB) |
| 1 | 0.01 | 2.52 | 7.25 | 0.75 |
| 16 | 0.16 | 1.99 | 4.77 | 0.62 |
| 32 | 0.32 | 1.49 | 3.20 | 0.48 |
| 64 | 0.64 | 0.67 | 1.26 | 0.23 |
| 96 | 0.96 | 0 | 0 | 0 |

| NUMBER OF WAVELENGTHS | SIGNAL POWER (mW) | TYPE OF OPTICAL FIBER ||||||||| 
| | | SMF ||| DSF ||| ExtCORE |||
| | | AVERAGE INPUT POWER (dBm/ch) ||| AVERAGE INPUT POWER (dBm/ch) ||| AVERAGE INPUT POWER (dBm/ch) |||
| | | 0 | -4 | -8 | 0 | -4 | -8 | 0 | -4 | -8 |
| | | ATTENUATION AMOUNT (dB) | ATTENUATION AMOUNT (dB) | ATTENUATION AMOUNT (dB) | ATTENUATION AMOUNT (dB) | ATTENUATION AMOUNT (dB) | ATTENUATION AMOUNT (dB) | ATTENUATION AMOUNT (dB) | ATTENUATION AMOUNT (dB) | ATTENUATION AMOUNT (dB) |
| 1 | 0.01 | 6.78 | 4.47 | 2.52 | 12.10 | 9.91 | 7.25 | 3.05 | 1.61 | 0.75 |
| 16 | 0.16 | 4.36 | 3.27 | 1.99 | 5.76 | 5.59 | 4.77 | 2.31 | 1.30 | 0.62 |
| 32 | 0.32 | 2.88 | 2.32 | 1.49 | 3.50 | 3.55 | 3.20 | 1.68 | 0.99 | 0.48 |
| 64 | 0.64 | 1.11 | 0.96 | 0.67 | 1.26 | 1.33 | 1.26 | 0.72 | 0.45 | 0.23 |
| 96 | 0.96 | 0 | 0 | 0 | 0 | 0 | 0 | 0 | 0 | 0 |

110d

FIG. 13
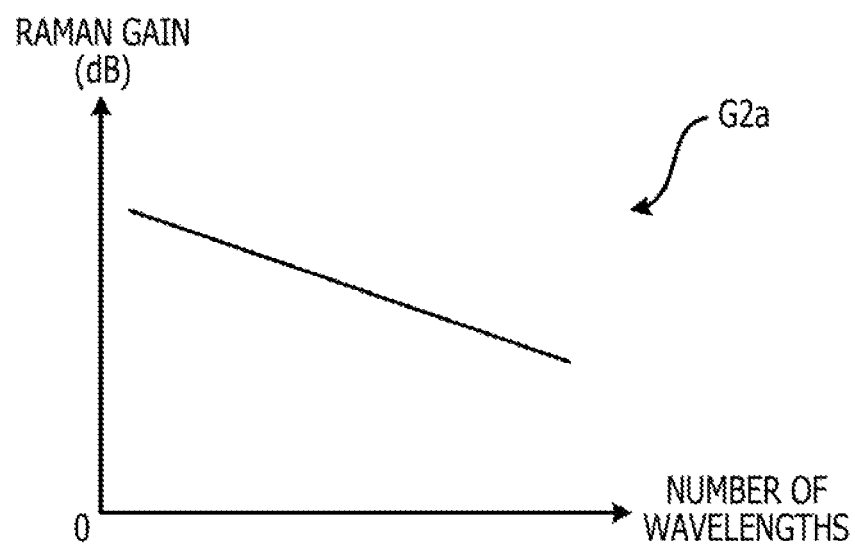
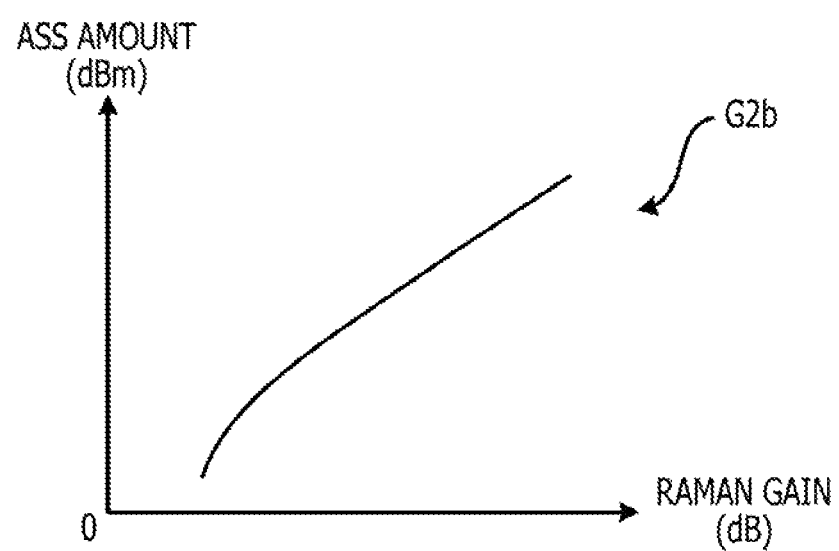

FIG. 18

| NUMBER OF WAVELENGTHS | TYPE OF OPTICAL FIBER | | | | | |
|---|---|---|---|---|---|---|
| | SMF | | DSF | | ExtCORE | |
| | ASS AMOUNT (dBm) | ATTENUATION AMOUNT (dB) | ASS AMOUNT (dBm) | ATTENUATION AMOUNT (dB) | ASS AMOUNT (dBm) | ATTENUATION AMOUNT (dB) |
| 1 | -29.32 | 6.78 | -23.42 | 7.25 | -34.64 | 0.75 |
| 16 | -29.45 | 4.36 | -24.46 | 4.77 | -34.69 | 0.62 |
| 32 | -29.65 | 2.88 | -25.14 | 3.20 | -34.73 | 0.48 |
| 64 | -30.03 | 1.11 | -26.21 | 1.26 | -34.81 | 0.23 |
| 96 | -30.30 | 0 | -26.86 | 0 | -34.89 | 0 |

| NUMBER OF WAVELENGTHS | TYPE OF OPTICAL FIBER = SMF | | | | | |
|---|---|---|---|---|---|---|
| | AVERAGE INPUT POWER (dBm/ch) | | | | | |
| | 0 | | -4 | | -8 | |
| | ASS AMOUNT (dBm) | ATTENUATION AMOUNT (dB) | ASS AMOUNT (dBm) | ATTENUATION AMOUNT (dB) | ASS AMOUNT (dBm) | ATTENUATION AMOUNT (dB) |
| 1 | -29.32 | 6.78 | -29.26 | 4.47 | -29.24 | 2.52 |
| 16 | -30.34 | 4.36 | -29.75 | 3.27 | -29.45 | 1.99 |
| 32 | -31.07 | 2.88 | -30.17 | 2.32 | -29.65 | 1.49 |
| 64 | -31.93 | 1.11 | -30.79 | 0.96 | -30.03 | 0.67 |
| 96 | -32.50 | 0 | -31.26 | 0 | -30.30 | 0 |

FIG. 20

| NUMBER OF WAVELENGTHS | TYPE OF OPTICAL FIBER = DSF ||||||
|---|---|---|---|---|---|---|
| | AVERAGE INPUT POWER (dBm/ch) ||||||
| | 0 || -4 || -8 ||
| | ASS AMOUNT (dBm) | ATTENUATION AMOUNT (dB) | ASS AMOUNT (dBm) | ATTENUATION AMOUNT (dB) | ASS AMOUNT (dBm) | ATTENUATION AMOUNT (dB) |
| 1 | -23.81 | 12.10 | -23.53 | 9.91 | -23.42 | 7.25 |
| 16 | -26.95 | 5.76 | -25.45 | 5.59 | -24.46 | 4.77 |
| 32 | -28.37 | 3.50 | -26.56 | 3.55 | -25.14 | 3.20 |
| 64 | -29.75 | 1.26 | -27.90 | 1.33 | -26.21 | 1.26 |
| 96 | -30.66 | 0 | -28.68 | 0 | -26.86 | 0 |

| NUMBER OF WAVELENGTHS | TYPE OF OPTICAL FIBER = ExtCORE | | | | | |
|---|---|---|---|---|---|---|
| | AVERAGE INPUT POWER (dBm/ch) | | | | | |
| | 0 | | -4 | | -8 | |
| | ASS AMOUNT (dBm) | ATTENUATION AMOUNT (dB) | ASS AMOUNT (dBm) | ATTENUATION AMOUNT (dB) | ASS AMOUNT (dBm) | ATTENUATION AMOUNT (dB) |
| 1 | -34.66 | 3.05 | -34.64 | 1.61 | -34.64 | 0.75 |
| 16 | -34.91 | 2.31 | -34.75 | 1.30 | -34.69 | 0.62 |
| 32 | -35.15 | 1.68 | -34.85 | 0.99 | -34.73 | 0.48 |
| 64 | -35.48 | 0.72 | -35.05 | 0.45 | -34.81 | 0.23 |
| 96 | -35.75 | 0 | -35.23 | 0 | -34.89 | 0 |

110h-3

TRANSMISSION DEVICE AND TRANSMISSION SYSTEM

CROSS-REFERENCE TO RELATED APPLICATION

This application is based upon and claims the benefit of priority of the prior Japanese Patent Application No. 2021-45383, filed on Mar. 19, 2021, the entire contents of which are incorporated herein by reference.

FIELD

The embodiments discussed herein are related to a transmission device and a transmission system.

BACKGROUND

A Raman amplifier may amplify high-data-rate optical signals, modulated by a multilevel modulation method such as 8-quadrature amplitude modulation (QAM), with a low noise amount. For example, there is disclosed a method in which a reception level of a Raman-amplified optical signal is detected and a loss amount of a variable attenuator that attenuates the optical signal is adjusted based on a result of this detection.

Examples of the related art includes as follows: Japanese Laid-open Patent Publication No. 2007-25510.

SUMMARY

According to an aspect of the embodiments, there is provided a transmission device including: a signal power detection circuit that detects signal power of a wavelength-division-multiplexed optical signal to be transmitted to a transmission line into which pumping light is inputted from a Raman amplifier; a variable optical attenuator that attenuates the wavelength-division-multiplexed optical signal; and a control circuit that reduces an attenuation amount of the variable optical attenuator depending on an increase in the signal power.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 2 illustrates a change in power of a wavelength-division-multiplexed optical signal with respect to the transmission distance, for each of numbers of wavelengths in the signal;

FIG. 10 illustrates a data table in a third embodiment;

FIG. 12 illustrates a data table in a fourth embodiment;

FIG. 13 illustrates examples of a relationship between the number of wavelengths and a Raman gain and a relationship between the Raman gain and a generation amount of spontaneous Raman scattering light;

FIG. 18 illustrates a data table in a seventh embodiment;

FIG. 19 illustrates a data table in an eighth embodiment (part 1);

FIG. 20 illustrates a data table in the eighth embodiment (part 2); and

FIG. 21 illustrates a data table in the eighth embodiment (part 3).

DESCRIPTION OF EMBODIMENTS

A gain of the Raman amplification depends on the number of wavelengths (the number of channels) included in a wavelength-division-multiplexed optical signal. Accordingly, for example, in a wavelength division multiplex optical transmission system, when the number of wavelengths in a wavelength-division-multiplexed optical signal fluctuates due to addition or drop of an optical signal in units of wavelength, the gain of the Raman amplification changes and thus the reception power of the wavelength-division-multiplexed optical signal fluctuates depending on the number of wavelengths. This may cause a decrease in transmission quality.

When the attenuation amount of the wavelength-division-multiplexed optical signal is adjusted depending on a monitoring result of the reception power of the wavelength-division-multiplexed optical signal as in the disclosure of Japanese Laid-open Patent Publication No. 2007-25510, fluctuation in the reception power may be reduced. However, for example, in the case where the number of wavelengths in the wavelength-division-multiplexed optical signal fluctuates at high speed due to frequent switching of optical paths, adjusting the attenuation amount such that the adjustment follows the high-speed fluctuation of the number of wavelengths is difficult due to time taken to transfer the monitoring result of the reception power of the wavelength-division-multiplexed optical signal to a transmission-side device.

Accordingly, an object of the present disclosure is to provide a transmission device and a transmission system that may suppress a decrease in transmission quality even when the number of wavelengths in a wavelength-division-multiplexed optical signal fluctuates at high speed.

(Example of Raman Amplification)

Figure 1:
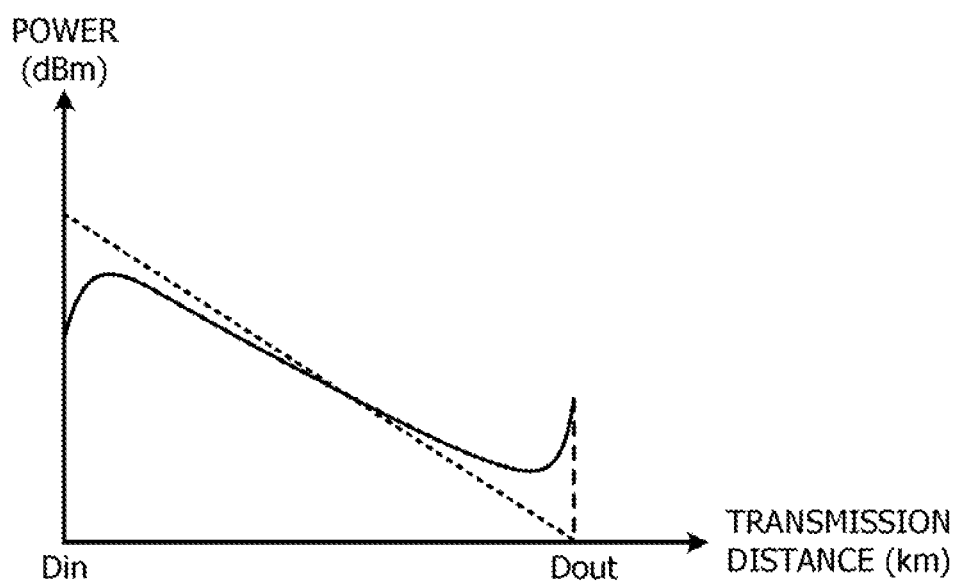
FIG. 1 illustrates examples of changes in power of optical signals in a transmission line between nodes, relative to a transmission distance.

FIG. 1 illustrates examples of changes in power (dBm) of optical signals in a transmission line between nodes, with respect to a transmission distance (km). A solid line illustrates a change in power of an optical signal amplified by a bidirectional distributed Raman amplifier and an erbium-doped fiber amplifier (EDFA), and a dotted line illustrates a change in power of an optical signal amplified only by the EDFA.

The bidirectional distributed Raman amplifier may amplify an optical signal, modulated by a multilevel modulation method such as 8-quadrature amplitude modulation (QAM) or 16-QAM, with a low noise amount (noise factor: NF). At an input end Din of the transmission line where an influence of a forward Raman amplifier is large, the power of the Raman-amplified optical signal is lower than that in the case where the optical signal is amplified only by the EDFA, and degradation of the optical signal due to a nonlinear optical effect is thus suppressed.

At an output end Dout of the transmission line where an influence of a rear Raman amplifier is large, the power of the Raman-amplified optical signal is higher than that in the case where the optical signal is amplified only by the EDFA, and an optical signal-to-noise ratio (OSNR) is thus improved. The bidirectional distributed Raman amplifier may thus extend the transmission distance of the optical signal.

FIG. 2 illustrates a change in power (dBm) of a wavelength-division-multiplexed optical signal with respect to the transmission distance (km), for each of numbers of wavelengths in the signal. Examples of the number of wavelengths described herein include 1 wavelength, 16 wavelengths, 32 wavelengths, 64 wavelengths, and 96 wavelengths. As understood by referring to a graph G1a, power at the input end Din of the transmission line is substantially the same regardless of the number of wavelengths, but differences in power among the numbers of wavelengths increase as the distance to the output end Dout of the transmission line decreases. The power in the case of one wavelength is the highest and the power in the case of 96 wavelengths is the lowest.

A graph G1b illustrates a peak value of the power at a peak position Dp in the graph G1a, for each number of wavelengths. The smaller the number of wavelengths is, the higher the power is. Accordingly, when the number of wavelengths in the wavelength-division-multiplexed optical signal decreases, the power increases, and thus the degradation of the wavelength-division-multiplexed optical signal due to the nonlinear optical effect increases.

A graph G1c illustrates power at the output end Dout of the transmission line in the graph G1a, for each number of wavelengths. Also at the output end Dout of the transmission line, the smaller the number of wavelengths is, the higher the power is.

As described above, the gain of the Raman amplifier (Raman gain) depends on the number of wavelengths. Thus, the larger the span in which the wavelength-division-multiplexed optical signal is transmitted is, the higher the possibility that the power of the optical signal does not fall within a normal receivable range at a reception node in a final stage due to accumulation of changes in the Raman gain is.

First Embodiment

Figure 3:
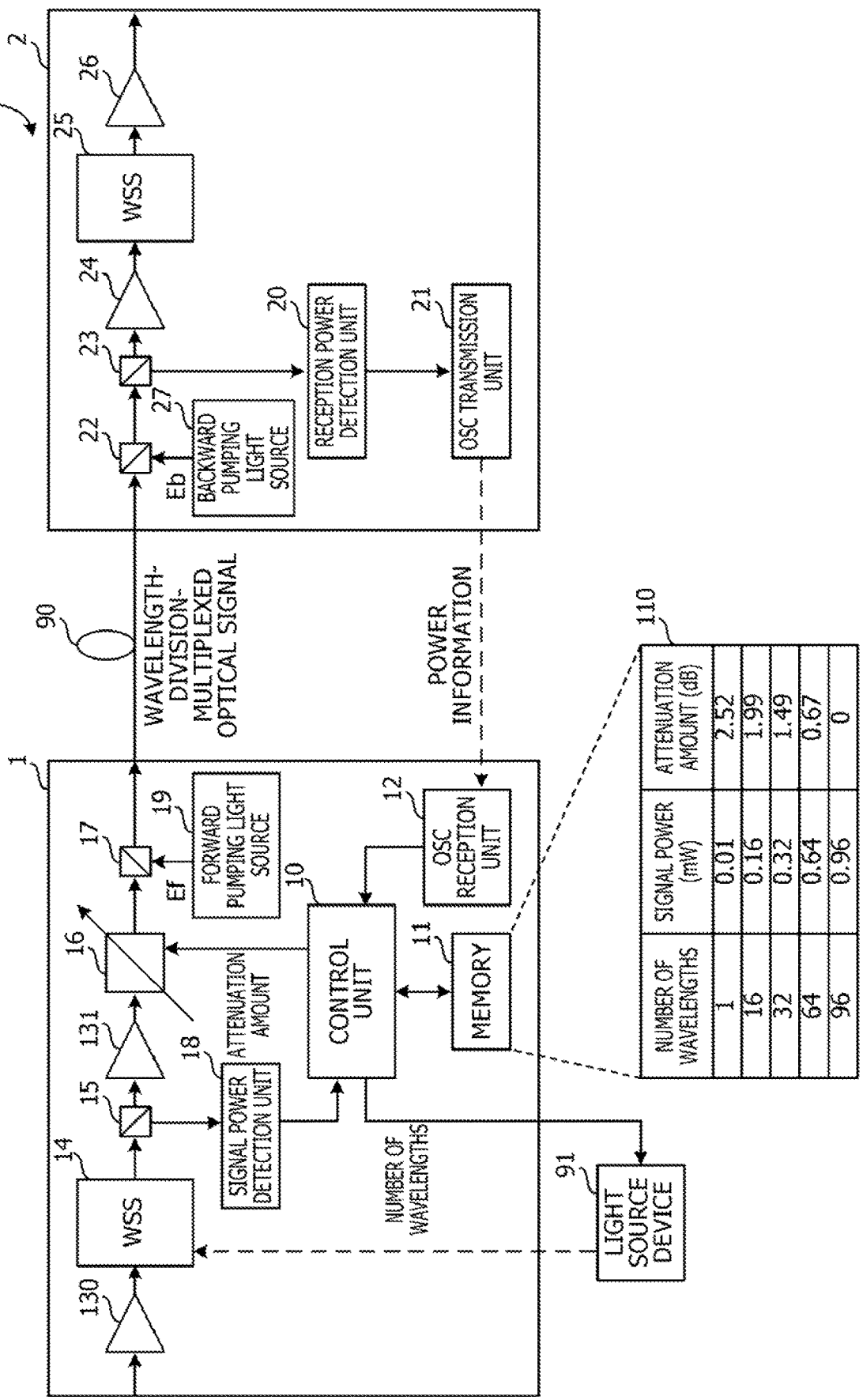
FIG. 3 is a diagram illustrating a transmission system in a first embodiment.

FIG. 3 is a diagram illustrating a transmission system 9 in a first embodiment. The transmission system 9 includes a transmission device 1 that transmits a wavelength-division-multiplexed optical signal to a transmission line 90 and a reception device 2 that receives the wavelength-division-multiplexed optical signal from the transmission device 1 via the transmission line 90.

The transmission device 1 and the reception device 2 wavelength-division-multiplex (add) new optical signals to the wavelength-division-multiplexed optical signal and demultiplex (drop) optical signals from the wavelength-division-multiplexed optical signal. The transmission device 1 is an example of a transmission device and the reception device 2 is an example of an opposite device on the opposite side of the transmission line 90 to the transmission device 1.

The transmission device 1 includes a control unit 10, a memory 11, an optical supervisory channel (OSC) reception unit 12, a wavelength selective switch (WSS) unit 14, a tap 15, a variable optical attenuator 16, and a wavelength divisional multiplexing (WDM) coupler 17. The transmission device 1 also includes a pre-amplifier 130, a post-amplifier 131, a signal power detection unit 18, and a forward pumping light source 19.

The pre-amplifier 130 receives a wavelength-division-multiplexed optical signal from a not-illustrated adjacent node in a previous stage. The pre-amplifier 130 is an EDFA and amplifies the wavelength-division-multiplexed optical signal and outputs it to the WSS unit 14.

The WSS unit 14 includes a wavelength selective switch, an optical coupler, an optical splitter, and the like and is optically coupled to a plurality of optical transceivers (transponders) that are not illustrated. The WSS unit 14 wavelength-division-multiplexes (adds) new optical signals from the optical transceivers to the wavelength-division-multiplexed optical signal and demultiplexes (drops) optical signals from the wavelength-division-multiplexed optical signal to output them to the optical transceivers, according to setting from a network monitoring device (not illustrated).

As described above, the number of wavelengths in the wavelength-division-multiplexed optical signal increases or decreases depending on the addition or drop by the WSS unit 14. The WSS unit 14 outputs a wavelength-division-multiplexed optical signal subjected to the addition or drop of optical signals, to the tap 15.

The tap 15 is, for example, an optical splitter and branches and outputs the wavelength-division-multiplexed optical signal to the post-amplifier 131 and the signal power detection unit 18. The signal power detection unit 18 includes, for example, a photodiode and the like, detects power (hereinafter, signal power) of the wavelength-division-multiplexed optical signal to be outputted to the transmission line 90, and outputs a detection value to the control unit 10. The post-amplifier 131 is an EDFA and amplifies the wavelength-division-multiplexed optical signal and outputs it to the variable optical attenuator 16.

The variable optical attenuator 16 attenuates the wavelength-division-multiplexed optical signal by an attenuation amount set by the control unit 10. The control unit 10 thereby adjusts the power of the wavelength-division-multiplexed optical signal to an appropriate value so that the transmission quality of the transmission system 9 satisfies a request. The WDM coupler 17 receives the wavelength-division-multiplexed optical signal from the variable optical attenuator 16.

The WDM coupler 17 is optically coupled to the forward pumping light source 19. The forward pumping light source 19 is a laser diode and outputs forward pumping light Ef to the WDM coupler 17. The wavelength-division-multiplexed optical signal is multiplexed with the forward pumping light Ef in the WDM coupler 17 and is transmitted to the transmission line 90. Since the forward pumping light Ef is outputted from the forward pumping light source 19 to the transmission line 90 for the wavelength-division-multiplexed optical signal as described above, the wavelength-division-multiplexed optical signal is Raman-amplified.

The reception device 2 receives the wavelength-division-multiplexed optical signal from the transmission line 90.

The reception device 2 includes a reception power detection unit 20, an OSC transmission unit 21, a WDM coupler 22, a tap 23, a pre-amplifier 24, a WSS unit 25, a post-amplifier 26, and a backward pumping light source 27. The WDM coupler 22 is optically coupled to the backward pumping light source 27.

The backward pumping light source 27 is a laser diode and outputs backward pumping light Eb to the transmission line 90 via the tap 22. The backward pumping light Eb flows through the transmission line 90 in a direction opposite to the direction of the wavelength-division-multiplexed optical signal. The wavelength-division-multiplexed optical signal is thereby Raman-amplified.

The forward pumping light source 19 and the backward pumping light source 27 are a bidirectional distributed Raman amplifier. However, the transmission system 9 may include only one of the forward pumping light source 19 and the backward pumping light source 27, and the Raman amplification of the wavelength-division-multiplexed optical signal is possible also in this case. The forward pumping light source 19 and the backward pumping light source 27 are examples of a Raman amplifier and the forward pumping light and the backward pumping light are examples of pumping light.

The tap 23 receives the wavelength-division-multiplexed optical signal from the WDM coupler 22. The tap 23 is, for example, an optical splitter and branches and outputs the wavelength-division-multiplexed optical signal to the pre-amplifier 24 and the reception power detection unit 20. The reception power detection unit 20 includes, for example, a photodiode and the like, detects power (hereinafter, reception power) of the wavelength-division-multiplexed optical signal received by the reception device 2, and outputs the detected power to the OSC transmission unit 21. The pre-amplifier 24 is an EDFA and amplifies the wavelength-division-multiplexed optical signal to output it to the WSS unit 25.

The WSS unit 25 includes a wavelength selective switch, an optical coupler, an optical splitter, and the like, and is optically coupled to a plurality of optical transceivers (transponders) that are not illustrated. As is the case with the WSS unit 14 of the transmission device 1, the WSS unit 25 wavelength-division-multiplexes new optical signals from the optical transceivers to the wavelength-division-multiplexed optical signal and demultiplexes optical signals from the wavelength-division-multiplexed optical signal to output them to the optical transceivers, according to setting from the network monitoring device (not illustrated). The WSS unit 25 outputs the wavelength-division-multiplexed optical signal subjected to the addition or drop of optical signals, to the post-amplifier 26. The post-amplifier 26 is an EDFA and amplifies the wavelength-division-multiplexed optical signal to output it to another device.

The OSC transmission unit 21 may communicate with the OSC reception unit 12 of the transmission device 1 via an OSC communication line. The OSC transmission unit 21 includes a logic circuit, a laser diode, and the like, and sends the OSC reception unit 12 power information indicating the reception power of the wavelength-division-multiplexed optical signal, for example, at the time of activation of the transmission system 9, that is before the start of the operation. The reception device 2 may communicate with the transmission device 1 via, for example, the network monitoring device instead of the OSC.

The OSC reception unit 12 includes a logic circuit, a photodiode, and the like and receives the power information from the OSC transmission unit 21 via the OSC. The OSC reception unit 12 outputs the power information to the control unit 10. The control unit 10 thereby obtains the reception power of the wavelength-division-multiplexed optical signal from the reception device 2. The OSC transmission unit 21 is an example of a notification unit that notifies the control unit 10 of the reception power.

The control unit 10 is, for example, a central processing unit (CPU) circuit and executes a series of processes according to a program. The control unit 10 is not limited to the CPU circuit and may be a circuit formed of hardware such as, for example, a field-programmable gate array (FPGA) or an application-specified integrated circuit (ASIC).

Before the start of the operation of the transmission system 9, the control unit 10 generates a data table 110 to be stored in the memory 11. A correlation among the number of wavelengths in the wavelength-division-multiplexed optical signal, the signal power, and the attenuation amount of the variable optical attenuator 16 in the case where the reception power of the wavelength-division-multiplexed optical signal is a target value is registered in the data table 110. The numbers of wavelengths in the wavelength-division-multiplexed optical signal are registered in advance by a network management device or the like before registration of the signal power and the attenuation amount. The data table 110 is an example of correlation data and the memory 11 is an example of a storage unit that stores the data table 110.

Before the start of the operation of the transmission system 9, the control unit 10 performs the light emission control of a light source device 91 optically coupled to the transmission device 1 and measures the signal power and the attenuation amount for each number of wavelengths in the data table 110. The light source device 91 includes light sources for light beams of a plurality of wavelengths, an optical coupler, and the like and generates a wavelength-division-multiplexed optical signal obtained by wavelength-division-multiplexing as many light beams as the number of wavelengths set by the control unit 10. The WSS unit 14 receives the wavelength-division-multiplexed optical signal from the light source device 91 and outputs the wavelength-division-multiplexed optical signal to the tap 15.

Accordingly, the control unit 10 may measure the signal power and the attenuation amount of the wavelength-division-multiplexed optical signal from the light source device 91 before the start of the operation of the transmission system 9 even when the WSS unit 14 receives no wavelength-division-multiplexed optical signal that is a main signal from the adjacent node (not illustrated) in the previous stage. The light source device 91 may be mounted in the transmission device 1.

Before the measurement of the signal power and the attenuation amount, the control unit 10 determines the target value of the reception power of the wavelength-division-multiplexed optical signal. For example, the control unit 10 sets the reception power in the case where the number of wavelengths included in the wavelength-division-multiplexed optical signal is the largest, as the target value. In this case, the control unit 10 sets the largest number of wavelengths in the light source device 91 and sets the attenuation amount of the variable optical attenuator 16 to 0. After setting the number of wavelengths and the attenuation amount, the control unit 10 obtains the reception power detected by the reception power detection unit 20 from the power information and sets the obtained reception power as the target value.

Thereafter, the control unit 10 adjusts the attenuation amount according to a change in the signal power depending on the number of wavelengths included in the wavelength-division-multiplexed optical signal to set the reception power to the target value. In the adjustment of the attenuation amount, every time the control unit 10 sets one of the numbers of wavelengths registered in the data table 110 in the light source device 91, the control unit 10 obtains the signal power from the signal power detection unit 18 and obtains the reception power from the reception power detection unit 20. The control unit 10 adjusts the attenuation amount to set the reception power to the target value and registers the signal power and the attenuation amount at the time of adjustment completion in the data table 110.

During the operation of the transmission system 9, the control unit 10 stops light emission of the light source device 91 and determines the attenuation amount from the signal power of the wavelength-division-multiplexed optical signal from the adjacent node, based on the data table 110. For example, the control unit 10 retrieves an attenuation amount corresponding to a value of signal power closest to the signal power detected by the signal power detection unit 18 among the values of signal power registered in the data table 110, and sets the retrieved attenuation amount in the variable optical attenuator 16.

In the data table 110, the larger the number of wavelengths is, the higher the signal power is, and the higher the signal power is, the lower the attenuation amount is. For example, when the number of wavelengths is 1, the signal power is 0.01 (mW) and the attenuation amount is 2.52 (dB). When the number of wavelengths is 96, the signal power is 0.96 (mW) and the attenuation amount is 0 (dB).

As described with reference to FIG. 2, the larger the number of wavelengths is, the lower the Raman gain is, and the lower the reception power is. The control unit 10 may thus reduce the attenuation amount as the signal power increases depending on the number of wavelengths, according to the data table 110, to average the reception power that changes depending on the number of wavelengths. The control unit 10 may thus set the reception power to a certain target value regardless of the number of wavelengths in the wavelength-division-multiplexed optical signal.

As described above, the control unit 10 reduces the attenuation amount of the variable optical attenuator 16 depending on the increase in the signal power. The configuration does not have to include the data table 110, and the control unit 10 may, for example, calculate the attenuation amount for setting the reception power to the target value, from the signal power according to an arithmetic formula set in advance. The control unit 10 may thus appropriately control the attenuation amount without obtaining the reception power from the reception device 2 during the transmission of the wavelength-division-multiplexed optical signal.

Accordingly, the transmission device 1 may thus suppress a decrease in transmission quality even when the number of wavelengths in the wavelength-division-multiplexed optical signal fluctuates at high speed.

In the embodiment, during the operation of the transmission system 9, the control unit 10 determines the attenuation amount based on the data table 110 generated before the start of the operation of the transmission system 9. Accordingly, the control unit 10 does not have to obtain the reception power from the reception device 2 and may also easily determine an appropriate attenuation amount.

Figure 4:
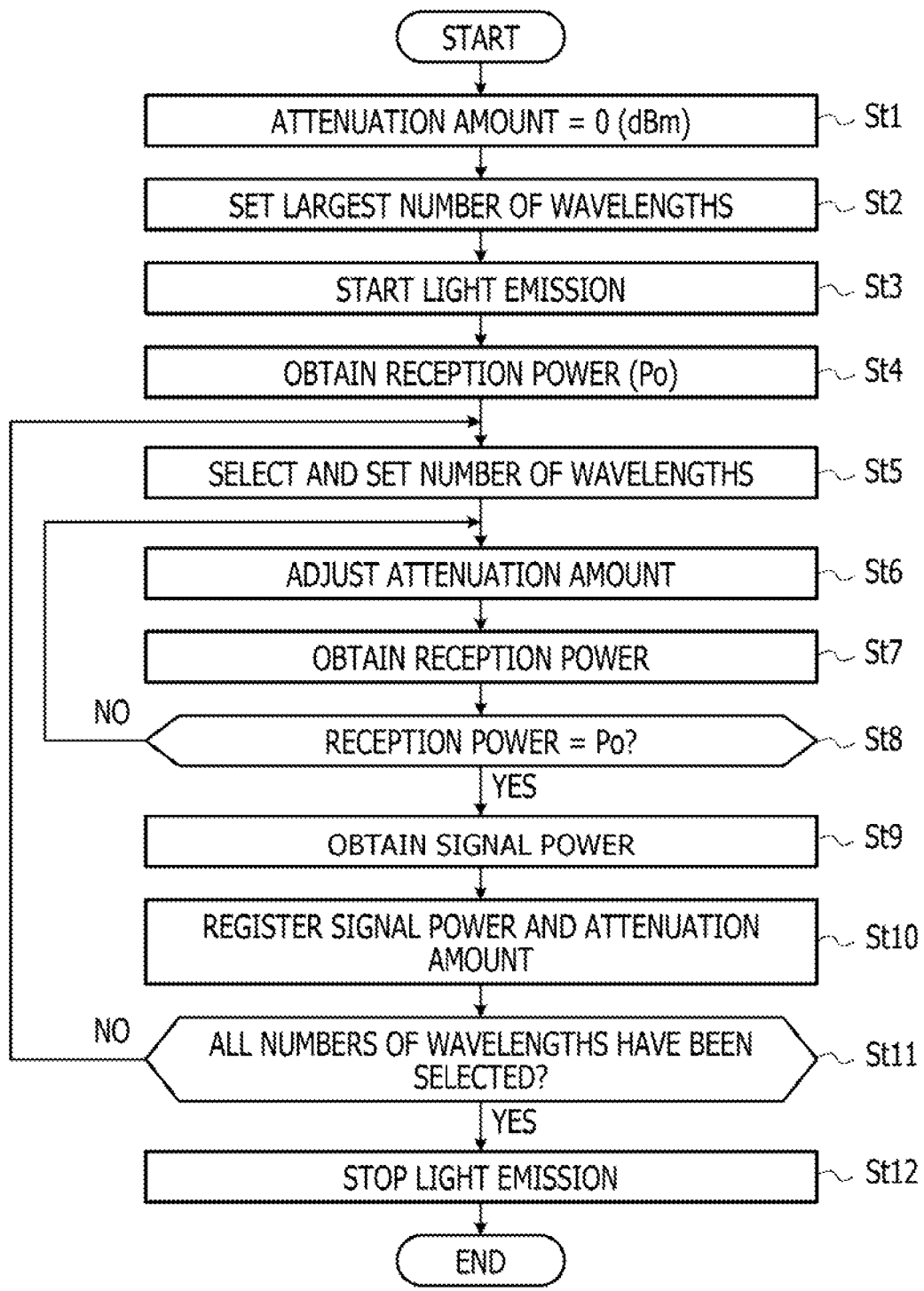
FIG. 4 is a flowchart illustrating an example of an operation of a control unit before start of an operation of the transmission system in the first embodiment.

FIG. 4 is a flowchart illustrating an example of an operation of the control unit 10 before the start of the operation of the transmission system 9 in the first embodiment. To determine the target value of the reception power, the control unit 10 sets the attenuation amount of the variable optical attenuator 16 to 0 (dBm) (step St1) and sets the largest number of wavelengths among the numbers of wavelengths in the data table 110, in the light source device 91 (step St2).

Next, the control unit 10 causes the light source device 91 to start light emission (step St3). The wavelength-division-multiplexed optical signal with the largest number of wavelengths is thereby outputted from the light source device 91 to the WSS unit 14.

Next, the control unit 10 obtains the reception power from the power information received via the OSC (step St4). In this case, the control unit 10 sets the obtained reception power as the target value Po. As described above, since the control unit 10 sets the reception power in the case where the number of wavelengths included in the wavelength-division-multiplexed optical signal is the largest as the target value, the control unit 10 is capable of controlling the reception power based on the lowest Raman gain during the operation of the transmission system 9. The control unit 10 is not limited to this configuration and may set the reception power corresponding to another number of wavelengths as the target value.

Next, the control unit 10 selects one of the numbers of wavelengths from the data table 110 and sets the selected number in the light source device 91 (step St5). The wavelength-division-multiplexed optical signal with the set number of wavelengths is thereby outputted from the light source device 91 to the WSS unit 14. The order of selecting the numbers of wavelengths in the data table 110 is not limited to a particular order.

Next, the control unit 10 adjusts the attenuation amount (step St6) and obtains the reception power from the power information received via the OSC (step St7). In this case, the control unit 10 increases or reduces the attenuation amount, for example, in units of predetermined width.

Next, the control unit 10 compares the reception power with the target value Po (step St8). In this case, the control unit 10 determines whether or not the reception power is substantially the same as the target value Po. For example, if the reception power is within a predetermined range including the target value Po, the control unit 10 determines that the reception power is substantially the same as the target value Po. If the reception power is outside the predetermined range, the control unit 10 determines that the reception power is different from the target value Po.

If the reception power is different from the target value Po (No in step St8), the processes of step St6 and beyond are executed again. If the reception power is substantially the same as the target value Po (Yes in step St8), the control unit 10 obtains the signal power from the signal power detection unit 18 (step St9).

Next, the control unit 10 registers the signal power and the attenuation amount in the data table 110 (step St10). The correlation between the signal power and the attenuation amount in the case where the reception power is the target value is thereby registered in the data table 110.

The control unit 10 then determines whether all numbers of wavelengths registered in the data table 110 have been selected (step St11). If there is an unselected number of wavelengths (No in step St11), the unselected number of wavelengths is selected (step St5), and the processes of step St6 and beyond are executed again.

If all numbers of wavelengths have been selected (Yes in step St11), the control unit 10 stops the light emission of the light source device 91 (step St12). The operation of the control unit 10 before the start of the operation of the transmission system 9 is thus performed.

Figure 5:
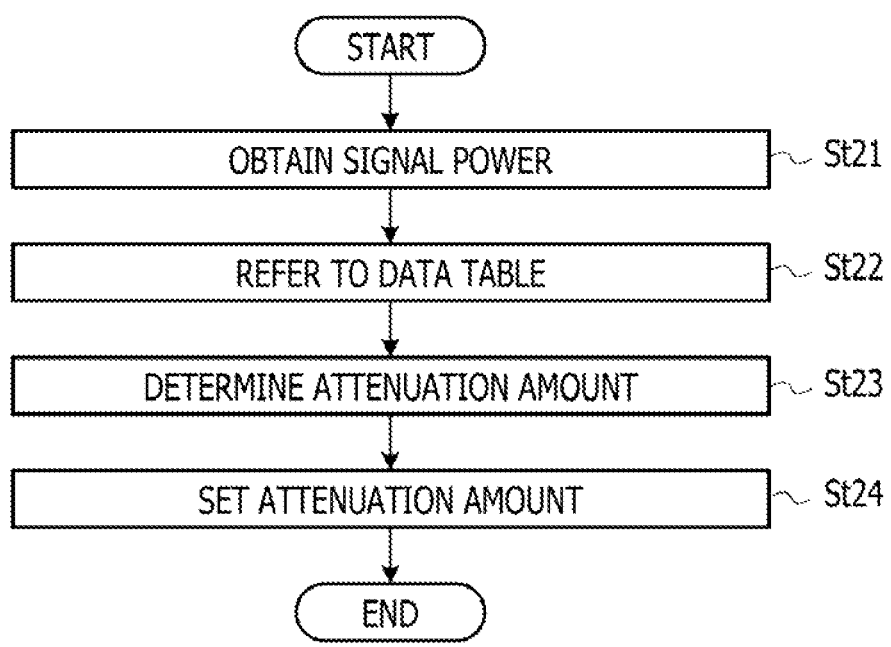
FIG. 5 is a flowchart illustrating an example of an operation of the control unit during the operation of the transmission system in the first embodiment.

FIG. 5 is a flowchart illustrating an example of the operation of the control unit 10 during the operation of the transmission system 9 in the first embodiment. This operation is repeatedly executed during the operation of the transmission system 9. The control unit 10 obtains the signal power from the signal power detection unit 18 (step St21).

Next, the control unit 10 refers to the data table 110 based on the signal power (step St22). In this case, for example, the control unit 10 retrieves a value closest to the signal power obtained from the signal power detection unit 18 among the values of signal power in the data table 110.

Next, the control unit 10 determines the attenuation amount from the signal power, based on the data table 110 (step St23). In this case, the control unit 10 determines the attenuation amount corresponding to the signal power retrieved from the data table 110 as the attenuation amount (control value) of the variable optical attenuator 16.

The control unit 10 then sets the determined attenuation amount in the variable optical attenuator 16 (step St24). The reception power is thereby controlled to the target value Po. The operation of the control unit 10 during the operation of the transmission system 9 is thus performed.

Figure 6:
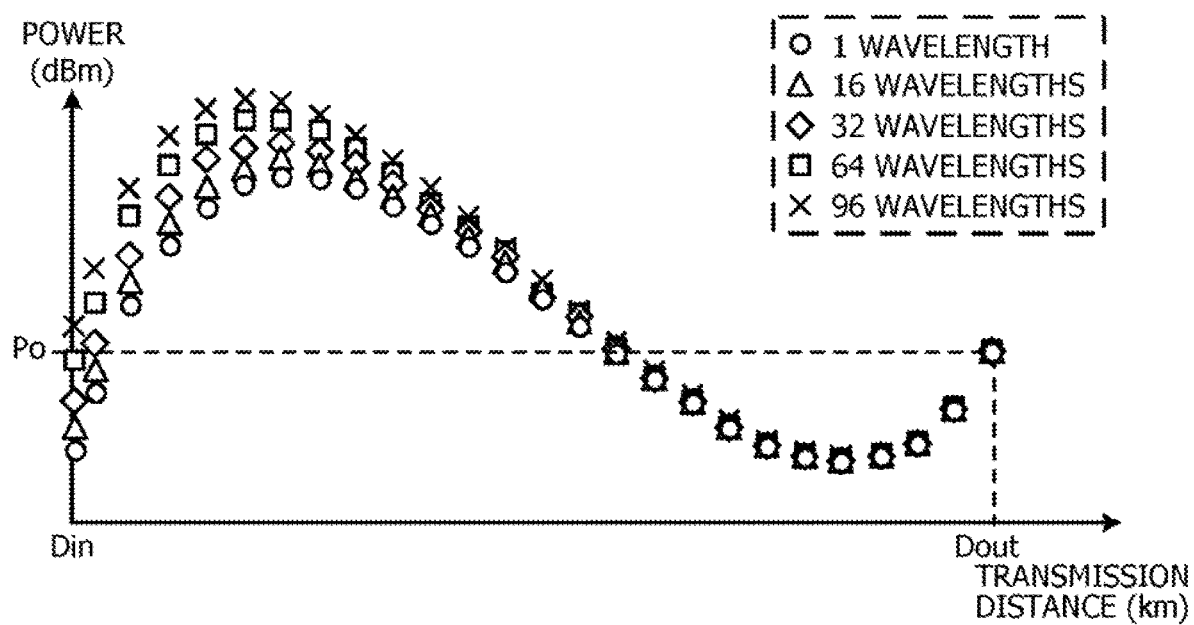
FIG. 6 illustrates a change in power of the wavelength-division-multiplexed optical signal with respect to the transmission distance, for each number of wavelengths in the signal in the case where the control unit controls an attenuation amount.

FIG. 6 illustrates a change in the power (dBm) of the wavelength-division-multiplexed optical signal with respect to the transmission distance (km), for each number of wavelengths in the signal in the case where the control unit 10 controls the attenuation amount. Although the power at the input end Din of the transmission line 90 varies depending on the number of wavelengths, the power at the output end Dout of the transmission line 90, for example, the reception power is controlled to the target value Po regardless of the number of wavelengths. The transmission quality of the wavelength-division-multiplexed optical signal is thus improved.

In this embodiment, the data table 110 includes combinations of the signal power and the attenuation amount and thus may be easily generated from the measurement results of the signal power and the attenuation amount. However, the control unit 10 is not limited to this and may calculate coefficients of a mathematical formula indicating the correlation between the signal power and the attenuation amount, store the coefficients in the memory 11, and calculate the attenuation amount according to the mathematical formula.

Figure 7:
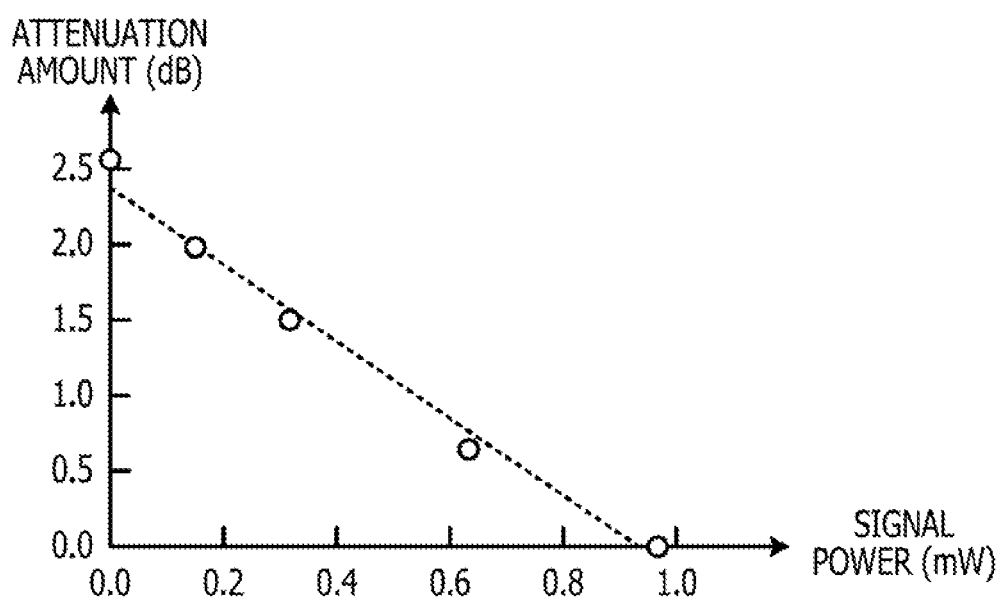
FIG. 7 illustrates an example of a relationship between signal power and the attenuation amount.

FIG. 7 illustrates an example of a relationship between the signal power (mW) and the attenuation amount (dB). The signal power and the attenuation amount registered in the data table 110 of the above example are plotted in a graph (see circles). The control unit 10 approximates the signal power and the attenuation amount in the aforementioned measurement results to a straight line of a linear function illustrated by a dotted line.

$$\text{Attenuation amount} = A \times \text{signal power} + B \quad (1)$$

For example, before the start of the operation of the transmission system 9, the control unit 10 fits the relationship between the signal power and the attenuation amount in the measurement results to the above formula (1). In the example of FIG. 7, the control unit 10 fits the linear function illustrated by the dotted line to the formula (1) and thereby obtains calculation results of coefficient $A=-2.63$ and coefficient $B=2.43$.

The control unit 10 stores coefficient $A=-2.63$ and coefficient $B=2.43$ in the memory 11. The coefficients A and B are examples of correlation data on the correlation between the signal power and the attenuation amount.

$$\text{Attenuation amount} = -2.63 \times \text{signal power} + 2.43 \quad (2)$$

After the start of the operation of the transmission system 9, the control unit 10 generates the above formula (2) by reading the coefficients A and B from the memory 11 and substituting the coefficients A and B into the formula (1). During the operation of the transmission system 9, the control unit 10 calculates the attenuation amount from the signal power by using the formula (2).

The control unit 10 thus determines the attenuation amount from the signal power, based on the coefficients A and B. Accordingly, the control unit 10 is capable of calculating the attenuation amount with higher accuracy than that in the case where the data table 110 is used. The mathematical formula used by the control unit 10 is not limited to the linear function and may be another mathematical formula such as a formula of a quadratic function.

As described above, before the start of the operation of the transmission system 9, the control unit 10 controls the attenuation amount of the variable optical attenuator 16 according to the change in the signal power depending on the number of wavelengths to set the reception power of the wavelength-division-multiplexed optical signal to the target value, and generates the data table 110 or the coefficients A and B of the formula (1) based on the signal power and the attenuation amount in the case where the reception power becomes the target value by the control of the attenuation amount. During the operation of the transmission system 9 after the generation of the data table 110 or the coefficients A and B, the control unit 10 determines the attenuation amount from the signal power, based on the data table 110 or the coefficients A and B.

Accordingly, during the operation of the transmission system 9, the control unit 10 does not have to obtain the reception power from the reception device 2 to determine the attenuation amount. The transmission device 1 is thus capable of controlling the reception power to the target value such that the control follows high-speed fluctuation of the number of wavelengths in the wavelength-division-multiplexed optical signal, and is capable of suppressing a decrease in transmission quality.

Although the control unit 10 generates the data table 110 or the coefficients A and B by using the transmission system 9 and stores the data table 110 or the coefficients A and B in the memory 11 in this embodiment, the configuration is not limited to this. The data table 110 or the coefficients A and B may be obtained from experimental results and simulation results based on design values of the transmission system 9 and stored in the memory 11 in advance. Also in this case, since the control unit 10 uses the data table 110 or the coefficients A and B stored in the memory 11, the same effect as that described above may be obtained.

Although the signal power detection unit 18 in this embodiment detects the power of the wavelength-divisionmultiplexed optical signal between the WSS unit 14 and the post-amplifier 131 as the signal power, the configuration is not limited to this. For example, the signal power detection unit 18 may detect signal power between the post-amplifier 131 and the variable optical attenuator 16. Also in this case, since the signal power changes according to the number of wavelengths in the wavelength-division-multiplexed optical signal, the same effect as that described above may be obtained.

Second Embodiment

Although the data table 110 on the correlation between the signal power and the attenuation amount is stored in the memory 11 in the first embodiment, the configuration is not limited to this. As in the following example, the memory 11 may store a data table on a correlation among the signal power, the attenuation amount, and an average value of input power per wavelength at the input end of the transmission line 90 (hereinafter, referred to as average input power) in the case where the reception power is the target value.

Figure 8:
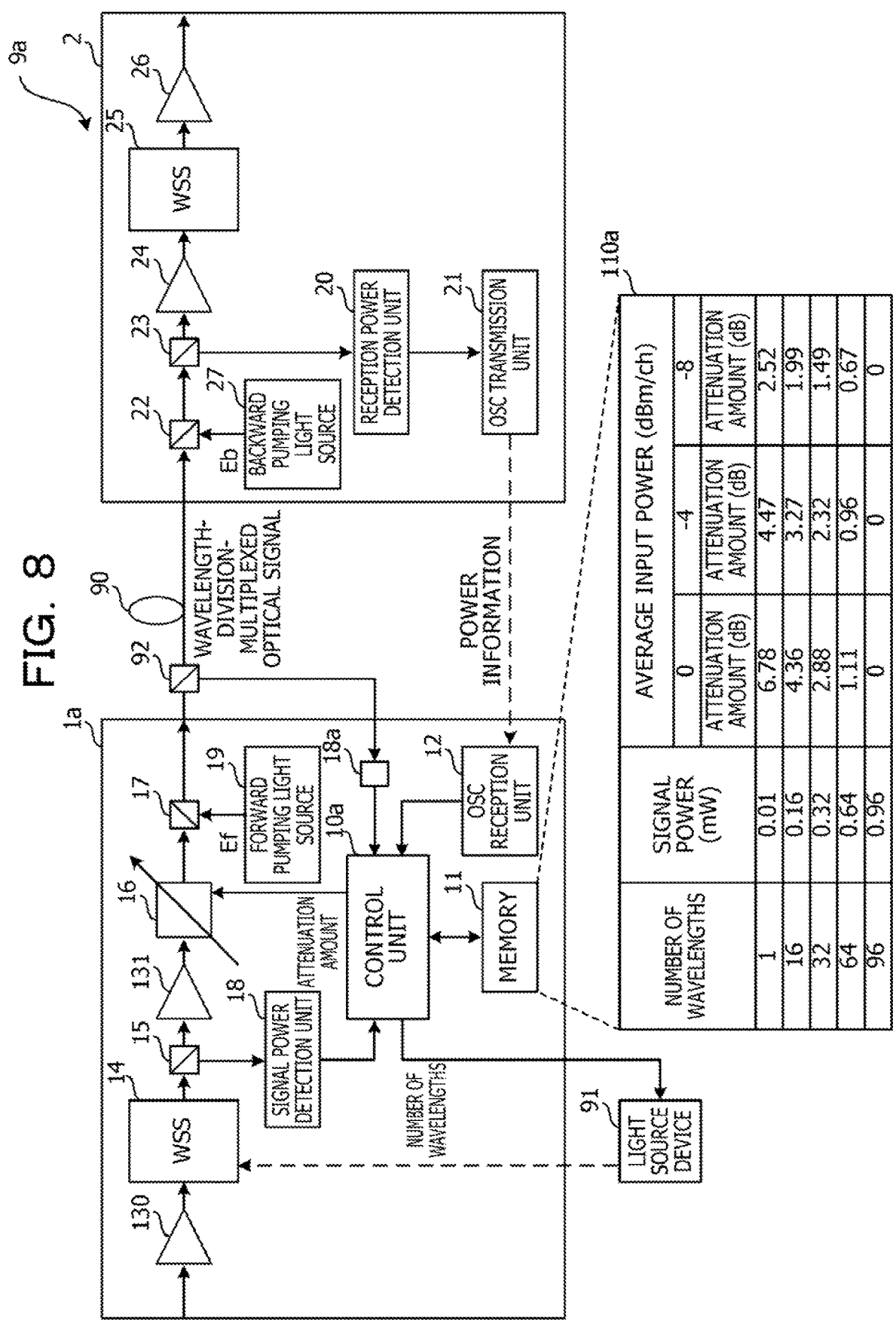
FIG. 8 is a diagram illustrating a transmission system in a second embodiment.

FIG. 8 is a diagram illustrating a transmission system 9a in a second embodiment. In FIG. 8, configurations common to those in FIG. 3 are denoted by the same reference signs as those in FIG. 3 and description thereof is omitted.

The transmission system 9a includes a transmission device 1a that transmits the wavelength-division-multiplexed optical signal to the transmission line 90 and the reception device 2 that receives the wavelength-division-multiplexed optical signal from the transmission device 1a via the transmission line 90. A tap 92 that branches the wavelength-division-multiplexed optical signal to the transmission device 1 and the reception device 2 is provided at an input end of the transmission line 90.

The transmission device 1a includes a control unit 10a, the memory 11, the OSC reception unit 12, the WSS unit 14, the tap 15, the variable optical attenuator 16, and the WDM coupler 17. The transmission device 1a also includes the pre-amplifier 130, the post-amplifier 131, the signal power detection unit 18, an input power detection unit 18a, and the forward pumping light source 19.

The input power detection unit 18a is optically coupled to the tap 92. The input power detection unit 18a includes a photodiode and the like and detects input power of the wavelength-division-multiplexed optical signal at the input end of the transmission line 90. The control unit 10a obtains a detection value of the input power from the input power detection unit 18a and calculates the average input power per wavelength by dividing the detection value by the number of wavelengths. Per wavelength herein refers to a wavelength allocated to one channel of wavelength division multiplex optical transmission. As in the first embodiment, the control unit 10a also obtains the signal power from the signal power detection unit 18 and obtains the reception power from the reception device 2 via the OSC.

The control unit 10a is, for example, a CPU circuit and executes a series of processes according to a program. The control unit 10a is not limited to the CPU circuit and may be, for example, a circuit formed of hardware such as an FPGA or an ASIC.

Before the start of the operation of the transmission system 9a, the control unit 10a generates a data table 110a from the measurement results of the signal power and the attenuation amount by the same method as that in the first embodiment, for each value of average input power (dBm/ch). In this case, the control unit 10a calculates the average input power by dividing the input power detected by the input power detection unit 18a by the number of wavelengths set in the light source device 91.

Combinations of the signal power and the attenuation amount corresponding to the respective numbers of wavelengths are registered in the data table 110a for each value of average input power. Examples of the average input power include, but are not limited to, 0 (dBm/ch), −4 (dBm/ch), and −8 (dBm/ch). The data table 110a is an example of the correlation data.

During the operation of the transmission system 9a, the control unit 10a determines the attenuation amount of the variable optical attenuator 16 from the signal power and the average input power, based on the data table 110. For example, the control unit 10a determines the attenuation amount from the correlation between the signal power and the attenuation amount corresponding to the average input power.

In this case, the control unit 10a calculates the average input power by dividing the input power detected by the input power detection unit 18a by, for example, the number of wavelengths set by the network monitoring device or the like. The control unit 10a is thus capable of setting an appropriate attenuation amount corresponding to the average input power in the variable optical attenuator 16.

The control unit 10a may generate the coefficients A and B in the above formula (1) for each value of average input power, instead of the data table 110a.

Figure 9:
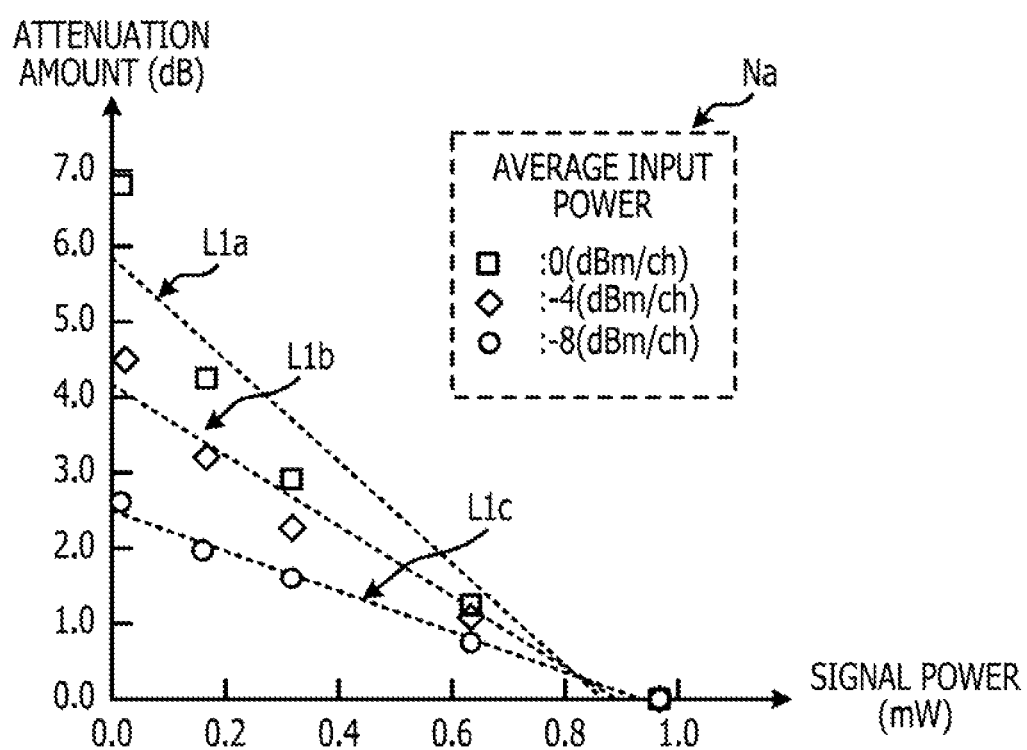
FIG. 9 illustrates an example of a relationship between the signal power and the attenuation amount for each value of average input power.

FIG. 9 illustrates an example of a relationship between the signal power and the attenuation amount for each value of average input power. The signal power and the attenuation amount registered in the data table 110a in the above example are plotted in a graph by using separate symbols (see reference sign Na) for the respective values of average input power.

For each value of average input power, the control unit 10a approximates the signal power and the attenuation amount in the aforementioned measurement results to a straight line of a linear function illustrated by a dotted line. A straight line L1a illustrates a characteristic in the case where the average input power is 0 (dBm/ch), a straight line L1b illustrates a characteristic in the case where the average input power is −4 (dBm/ch), and a straight line L1c illustrates a characteristic in the case where the average input power is −8 (dBm/ch).

For example, before the start of the operation of the transmission system 9a, the control unit 10a fits the relationship between the signal power and the attenuation amount in the measurement results to the above formula (1). The control unit 10a calculates the coefficients A and B for each of the straight lines L1a, L1b, and L1c and stores the coefficients A and B in the memory 11. The coefficients A and B are examples of correlation data on the correlation between the signal power and the attenuation amount.

After the start of the operation of the transmission system 9a, the control unit 10a reads the coefficients A and B corresponding to the average input power from the memory 11 and substitutes the coefficients A and B into the formula (1) to generate a mathematical formula of a linear function similar to the formula (2). During the operation of the transmission system 9a, the control unit 10a calculates the attenuation amount from the signal power by using the mathematical formula.

The control unit 10a thus determines the attenuation amount from the signal power, based on the coefficients A and B corresponding to the average input power. Accordingly, the control unit 10a is capable of calculating the attenuation amount with higher accuracy than that in the case where the data table 110a is used. The mathematical formula used by the control unit 10a is not limited to the linear function and may be another mathematical formula such as a formula of a quadratic function.

Third Embodiment

A data table on a correlation among the signal power, the attenuation amount, and the type of the transmission line 90 may be stored in the memory 11. A type of optical fiber is described as an example of the type of transmission line 90 in this embodiment. Examples of the type of optical fiber include, but are not limited to, single mode optical fiber (SMF), dispersion shifted optical fiber (DSF) and ExtCORE. A transmission system in this embodiment has the same configuration as that in the first embodiment.

FIG. 10 illustrates a data table 110c in the third embodiment. The signal power, the attenuation amount, and the type of optical fiber in the case where the reception power is the target value are registered in the data table 110c. For example, the data table 110c illustrates a correlation among the signal power, the attenuation amount, and the type of optical fiber. The data table 110c is an example of the correlation data.

Before the start of the operation of the transmission system 9, the control unit 10 generates the data table 110c from the measurement results of the signal power and the attenuation amount by the same method as that in the first embodiment, for each type of optical fiber. Combinations of the signal power and the attenuation amount corresponding to the respective numbers of wavelengths are registered in the data table 110c for each type of optical fiber.

During the operation of the transmission system 9, the control unit 10 determines the attenuation amount of the variable optical attenuator 16 from the signal power and the type of optical fiber, based on the data table 110c. For example, the control unit 10 determines the attenuation amount from the correlation between the signal power and the attenuation amount corresponding to the type of optical fiber.

In this case, the control unit 10 receives a notification of the type of optical fiber in the transmission line 90 from, for example, the network monitoring device or the like. The control unit 10 is thus capable of setting an appropriate attenuation amount corresponding to the type of optical fiber in the variable optical attenuator 16.

The control unit 10 may generate the coefficients A and B in the above formula (1) for each type of optical fiber, instead of the data table 110c.

Figure 11:
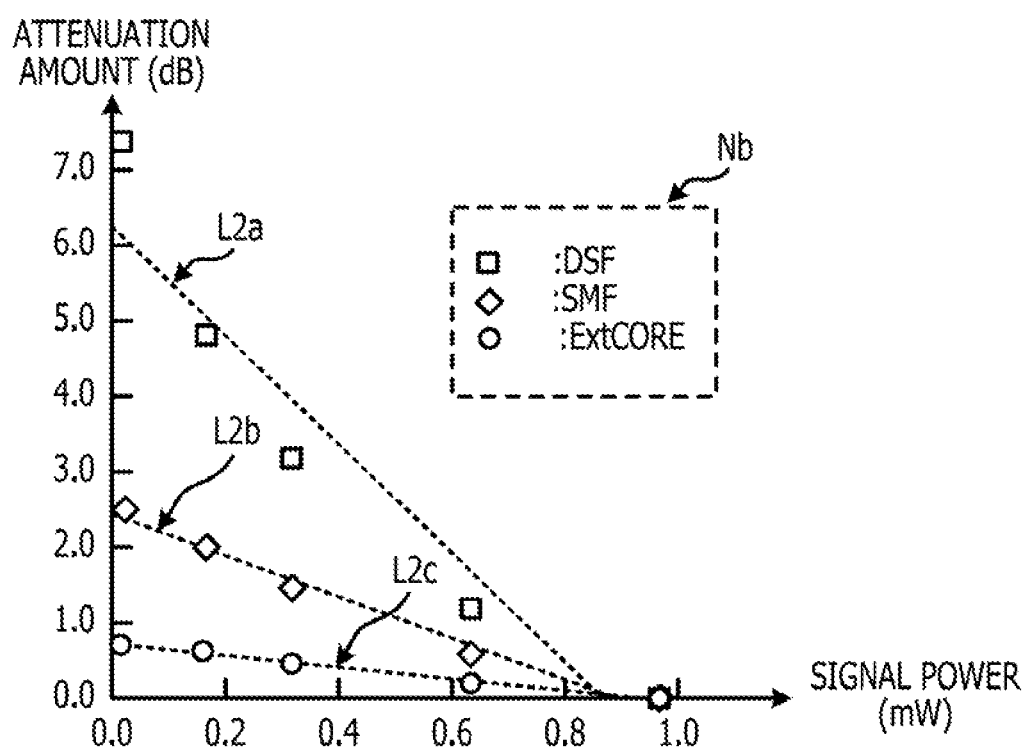
FIG. 11 illustrates an example of a relationship between the signal power and the attenuation amount for each type of optical fiber.

FIG. 11 illustrates an example of a relationship between the signal power and the attenuation amount for each type of optical fiber. The signal power and the attenuation amount registered in the data table 110c in the above example are plotted in a graph by using separate symbols (see reference sign Nb) for the respective types of optical fibers.

For each type of optical fiber, the control unit 10 approximates the signal power and the attenuation amount in the aforementioned measurement results to a straight line of a linear function illustrated by a dotted line. A straight line L2a illustrates a characteristic in the case where the type of optical fiber is DSF, a straight line L2b illustrates a characteristic in the case where the type of optical fiber is SMF, and a straight line L2c illustrates a characteristic in the case where the type of optical fiber is ExtCORE.

For example, before the start of the operation of the transmission system 9, the control unit 10 fits the relationship between the signal power and the attenuation amount in the measurement results to the above formula (1). The control unit 10 calculates the coefficients A and B for each of the straight lines L2a, L2b, and L2c and stores the coefficients A and B in the memory 11. The coefficients A and B are examples of correlation data on the correlation between the signal power and the attenuation amount.

After the start of the operation of the transmission system 9, the control unit 10 reads the coefficients A and B corresponding to the type of optical fiber from the memory 11 and substitutes the coefficients A and B into the formula (1) to generate a mathematical formula of a linear function similar to the formula (2). During the operation of the transmission system 9, the control unit 10 calculates the attenuation amount from the signal power by using the mathematical formula.

The control unit 10 thus determines the attenuation amount from the signal power, based on the coefficients A and B corresponding to the type of optical fiber. Accordingly, the control unit 10 is capable of calculating the attenuation amount with higher accuracy than that in the case where the data table 110c is used.

Fourth Embodiment

A data table on a correlation among the signal power, the attenuation amount, the average input power, and the type of optical fiber may be stored in the memory 11. In this embodiment, the average input power is calculated as in the second embodiment and the type of optical fiber is the same as that in the third embodiment. A transmission system in this embodiment has the same configuration as that in the second embodiment.

FIG. 12 illustrates a data table 110d in the fourth embodiment. The signal power, the attenuation amount, the average input power, and the type of optical fiber in the case where the reception power is the target value are registered in the data table 110d. For example, the data table 110d illustrates a correlation among the signal power, the attenuation amount, the average input power, and the type of optical fiber.

Before the start of the operation of the transmission system 9a, the control unit 10a generates the data table 110d from the measurement results of the signal power and the attenuation amount by the same method as that in the first embodiment, for each combination of the average input power and the type of optical fiber. Combinations of the signal power and the attenuation amount corresponding to the respective numbers of wavelengths are registered in the data table 110d for each combination of the average input power and the type of optical fiber. The data table 110d is an example of the correlation data.

During the operation of the transmission system 9a, the control unit 10a determines the attenuation amount of the variable optical attenuator 16 from the signal power, the average input power, and the type of optical fiber, based on the data table 110c. For example, the control unit 10a determines the attenuation amount from the correlation between the signal power and the attenuation amount corresponding to the combination of the average input power and the type of optical fiber.

In this case, the control unit 10a receives a notification of the type of optical fiber in the transmission line 90 from, for example, the network monitoring device or the like. The control unit 10a is thus capable of setting an appropriate attenuation amount, corresponding not only to the average input power but also to the type of optical fiber, in the variable optical attenuator 16.

The control unit 10a may generate a mathematical formula indicating the correlation among the signal power, the average input power, the type of optical fiber, and the attenuation amount, by the same method as that described above, before the start of the operation of the transmission system 9a. In this case, the control unit 10a may store coefficients of the mathematical formula in the memory 11 and read the coefficients during the operation of the transmission system 9a to use the coefficients for the determination of the attenuation amount.

Fifth Embodiment

Although the input power is used to determine the attenuation amount in the first to fourth embodiments, the configuration is not limited to this. In this embodiment, a generation amount (dBm) of spontaneous Raman scattering (amplified spontaneous Raman scattering: ASS) light (hereinafter, referred to as ASS amount) is used instead of the input power. The spontaneous Raman scattering is noise light generated with Raman amplification.

FIG. 13 illustrates examples of a relationship between the number of wavelengths and the Raman gain (dB) and a relationship between the Raman gain (dB) and the generation amount of spontaneous Raman scattering light (ASS amount) (dBm). A graph G1a illustrates the relationship between the number of wavelengths and the Raman gain. As described above, the Raman gain linearly decreases as the number of wavelengths increases.

A graph G2b illustrates the relationship between the Raman gain and the ASS amount. The ASS amount linearly increases as the Raman gain increases. Accordingly, the higher the Raman gain is, the higher the ASS amount is. A change in the Raman gain that occurs with a change in the number of wavelengths may be thus detected by detecting the ASS amount.

Figure 14:
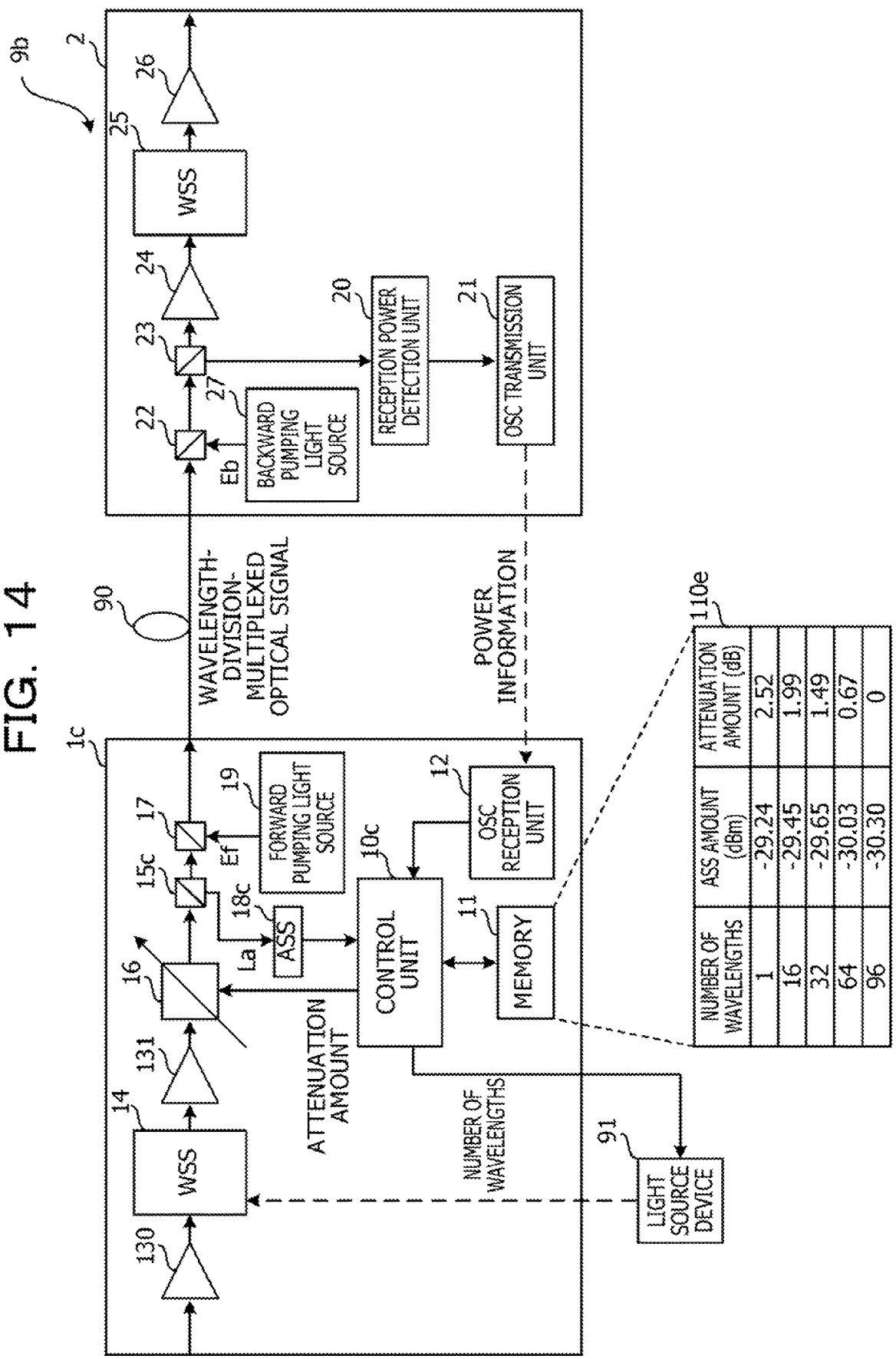
FIG. 14 is a diagram illustrating a transmission system in a fifth embodiment.

FIG. 14 is a diagram illustrating a transmission system 9b in the fifth embodiment. In FIG. 14, configurations common to those in FIG. 3 are denoted by the same reference signs as those in FIG. 3 and description thereof is omitted.

The transmission system 9b includes a transmission device 1c that transmits the wavelength-division-multiplexed optical signal to the transmission line 90 and the reception device 2 that receives the wavelength-division-multiplexed optical signal from the transmission device 1c via the transmission line 90. The transmission device 1c includes a control unit 10c, the memory 11, the OSC reception unit 12, the WSS unit 14, a tap 15c, the variable optical attenuator 16, and the WDM coupler 17. The transmission device 1c also includes the pre-amplifier 130, the post-amplifier 131, an ASS detection unit 18c, and the forward pumping light source 19.

The tap 15c is, for example, a WDM coupler and is optically coupled between the variable optical attenuator 16 and the WDM coupler 17. The tap 15c guides the ASS light received from the forward pumping light source 19 via the WDM coupler 17, to the ASS detection unit 18c. The tap 15c also guides the wavelength-division-multiplexed optical signal received from the variable optical attenuator 16, to the WDM coupler 17.

The ASS detection unit 18c includes, for example, a photodiode and the like and detects the ASS amount to output a detection value to the control unit 10c. The ASS detection unit 18c is an example of an ASS light detection unit that detects the generation amount of the ASS light of the forward pumping light source 19.

The control unit 10c is, for example, a CPU circuit and executes a series of processes according to a program. The control unit 10c is not limited to the CPU circuit and may be, for example, a circuit formed of hardware such as an FPGA or an ASIC.

Before the start of the operation of the transmission system 9b, the control unit 10c generates a data table 110e to be stored in the memory 11. A correlation among the number of wavelengths in the wavelength-division-multiplexed optical signal, the ASS amount, and the attenuation amount of the variable optical attenuator 16 in the case where the reception power of the wavelength-division-multiplexed optical signal is the target value are registered in the data table 110e. The data table 110e is an example of correlation data on a correlation between the ASS amount and the attenuation amount in the case where the reception power of the wavelength-division-multiplexed optical signal is the target value.

Before the start of the operation of the transmission system 9b, the control unit 10c performs the light emission control of the light source device 91 and the setting of the number of wavelengths as in the first embodiment and measures the ASS amount and the attenuation amount for each number of wavelengths in the data table 110e. Before the measurement, for example, the control unit 10c sets the reception power in the case where the number of wavelengths included in the wavelength-division-multiplexed optical signal is the largest, as the target value.

Thereafter, the control unit 10c adjusts the attenuation amount according to a change in the ASS amount depending on the number of wavelengths included in the wavelength-division-multiplexed optical signal to set the reception power to the target value. In the adjustment of the attenuation amount, every time the control unit 10c sets one of the numbers of wavelengths registered in the data table 110e in the light source device 91, the control unit 10c obtains the ASS amount from the ASS detection unit 18c and obtains the reception power from the reception power detection unit 20. The control unit 10c adjusts the attenuation amount to set the reception power to the target value and registers the ASS amount and the attenuation amount at the time of adjustment completion in the data table 110e.

During the operation of the transmission system 9b, the control unit 10c stops the light emission of the light source device 91 and determines the attenuation amount from the ASS amount, based on the data table 110e. For example, the control unit 10c retrieves an attenuation amount corresponding to an ASS amount closest to the ASS amount detected by the ASS detection unit 18c among the ASS amounts registered in the data table 110e, and sets the retrieved ASS amount in the variable optical attenuator 16.

In the data table 110e, the larger the number of wavelengths is, the lower the ASS amount is, and the lower the ASS amount is, the lower the attenuation amount is. For example, when the number of wavelengths is 1, the ASS amount is −29.24 (dBm) and the attenuation amount is 2.52 (dB). When the number of wavelengths is 96, the ASS amount is −30.30 (dBm) and the attenuation amount is 0 (dB).

As described above, the larger the number of wavelengths is, the lower the Raman gain is, and the lower the ASS amount is. The control unit 10c may thus reduce the attenuation amount as the ASS amount decreases depending on the number of wavelengths, according to the data table 110e, to average the reception power that changes depending on the number of wavelengths. The control unit 10 may thus set the reception power to a certain target value regardless of the number of wavelengths in the wavelength-division-multiplexed optical signal.

The control unit 10c thus reduces the attenuation amount of the variable optical attenuator 16 depending on the decrease in the ASS amount. The configuration does not have to include the data table 110e, and the control unit 10c may, for example, calculate the attenuation amount for setting the reception power to the target value, from the ASS amount according to an arithmetic formula set in advance. The control unit 10c may thus appropriately control the attenuation amount without obtaining the reception power from the reception device 2 during the transmission of the wavelength-division-multiplexed optical signal.

Accordingly, the transmission device 1 may thus suppress a decrease in transmission quality even when the number of wavelengths in the wavelength-division-multiplexed optical signal fluctuates at high speed.

In the embodiment, since the control unit 10c determines the attenuation amount based on the data table 110e during the operation of the transmission system 9b, the control unit 10e does not have to obtain the reception power from the reception device 2 and may also easily determine an appropriate attenuation amount.

Figure 15:
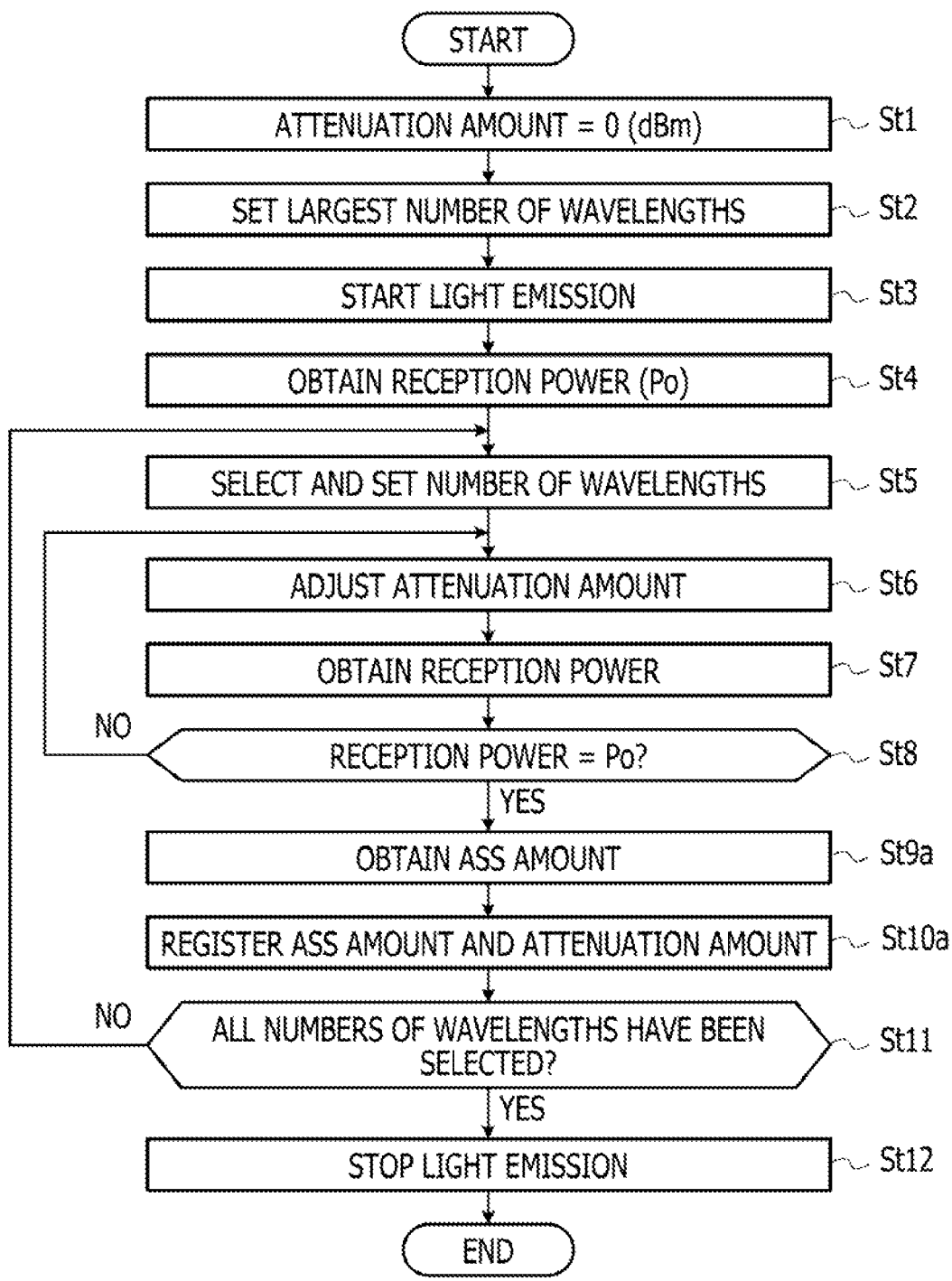
FIG. 15 is a flowchart illustrating an example of an operation of a control unit before start of an operation of the transmission system in the fifth embodiment.

FIG. 15 is a flowchart illustrating an example of an operation of the control unit 10c before the start of the operation of the transmission system 9b in the fifth embodiment. In FIG. 15, processes common to those in FIG. 4 are denoted by the same reference signs and description thereof is omitted.

When the reception power is substantially the same as the target value Po (Yes in step St8), the control unit 10c obtains the ASS amount from the ASS detection unit 18c (step St9a). Next, the control unit 10c registers the ASS amount and the attenuation amount in the data table 110e (step St10a). The correlation between the ASS amount and the attenuation amount is thereby registered in the data table 110e. The operation of the control unit 10c before the start of the operation of the transmission system 9b is thus performed.

Figure 16:
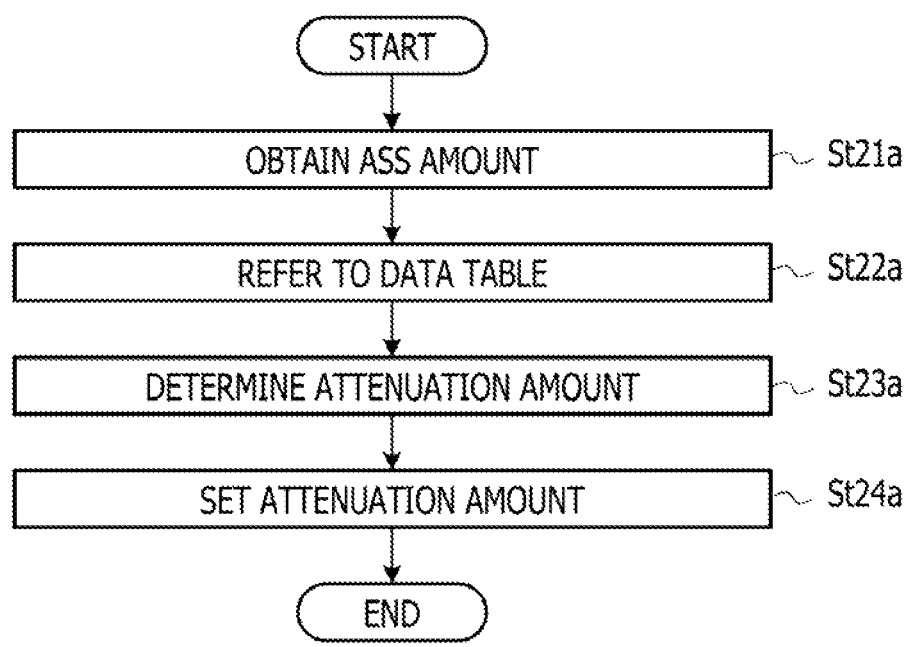
FIG. 16 is a flowchart illustrating an example of an operation of the control unit during the operation of the transmission system in the fifth embodiment.

FIG. 16 is a flowchart illustrating an example of the operation of the control unit 10c during the operation of the transmission system 9b in the fifth embodiment. This operation is repeatedly executed during the operation of the transmission system 9b.

The control unit 10c obtains the ASS amount from the ASS detection unit 18c (step St21a). Next, the control unit 10c refers to the data table 110e based on the ASS amount (step St22a). In this case, for example, the control unit 10c retrieves a value closest to the ASS amount obtained from the ASS detection unit 18c among the values of the ASS amounts in the data table 110e.

Next, the control unit 10c determines the attenuation amount from the ASS amount, based on the data table 110e (step St23a). In this case, the control unit 10c determines the attenuation amount corresponding to the ASS amount retrieved from the data table 110e as the attenuation amount (control value) of the variable optical attenuator 16.

The control unit 10c then sets the determined attenuation amount in the variable optical attenuator 16 (step St24a). The reception power is thereby controlled to the target value Po. The operation of the control unit 10c during the operation of the transmission system 9b is thus performed.

As described above, before the start of the operation of the transmission system 9b, the control unit 10c controls the attenuation amount of the variable optical attenuator 16 according to the change in the ASS amount depending on the number of wavelengths to set the reception power of the wavelength-division-multiplexed optical signal to the target value, and generates the data table 110e based on the signal power and the attenuation amount in the case where the reception power becomes the target value by the control of the attenuation amount. During the operation of the transmission system 9b after the generation of the data table 110e, the control unit 10c determines the attenuation amount from the ASS amount, based on the data table 110e.

Accordingly, during the operation of the transmission system 9b, the control unit 10c does not have to obtain the reception power from the reception device 2 to determine the attenuation amount. The transmission device 1c thus may control the reception power to the target value such that the control follows high-speed fluctuation of the number of wavelengths in the wavelength-division-multiplexed optical signal, and may suppress a decrease in the transmission quality.

Although the control unit 10c uses the transmission system 9b to generate the data table 110e and stores the data table 110e in the memory 11 in this embodiment, the configuration is not limited to this. The data table 110e may be obtained from experimental results and simulation results based on design values of the transmission system 9b and stored in the memory 11 in advance. Also in this case, since the control unit 10c uses the data table 110e stored in the memory 11, the same effect as that described above may be obtained.

The control unit 10c may generate a mathematical formula indicating the correlation between the ASS amount and the attenuation amount by the same method as that described above, before the start of the operation of the transmission system 9b. In this case, the control unit 10c may store coefficients of the mathematical formula in the memory 11 and read the coefficients to use them for the determination of the attenuation amount during the operation of the transmission system 9b.

Sixth Embodiment

Although the data table 110e on the correlation between the ASS amount and the attenuation amount is stored in the memory 11 in the fifth embodiment, the embodiment is not limited to this. As in the following example, a data table on a correlation among the ASS amount, the attenuation amount, and the average input power as in the second embodiment in the case where the reception power is the target value may be stored in the memory 11.

Figure 17:
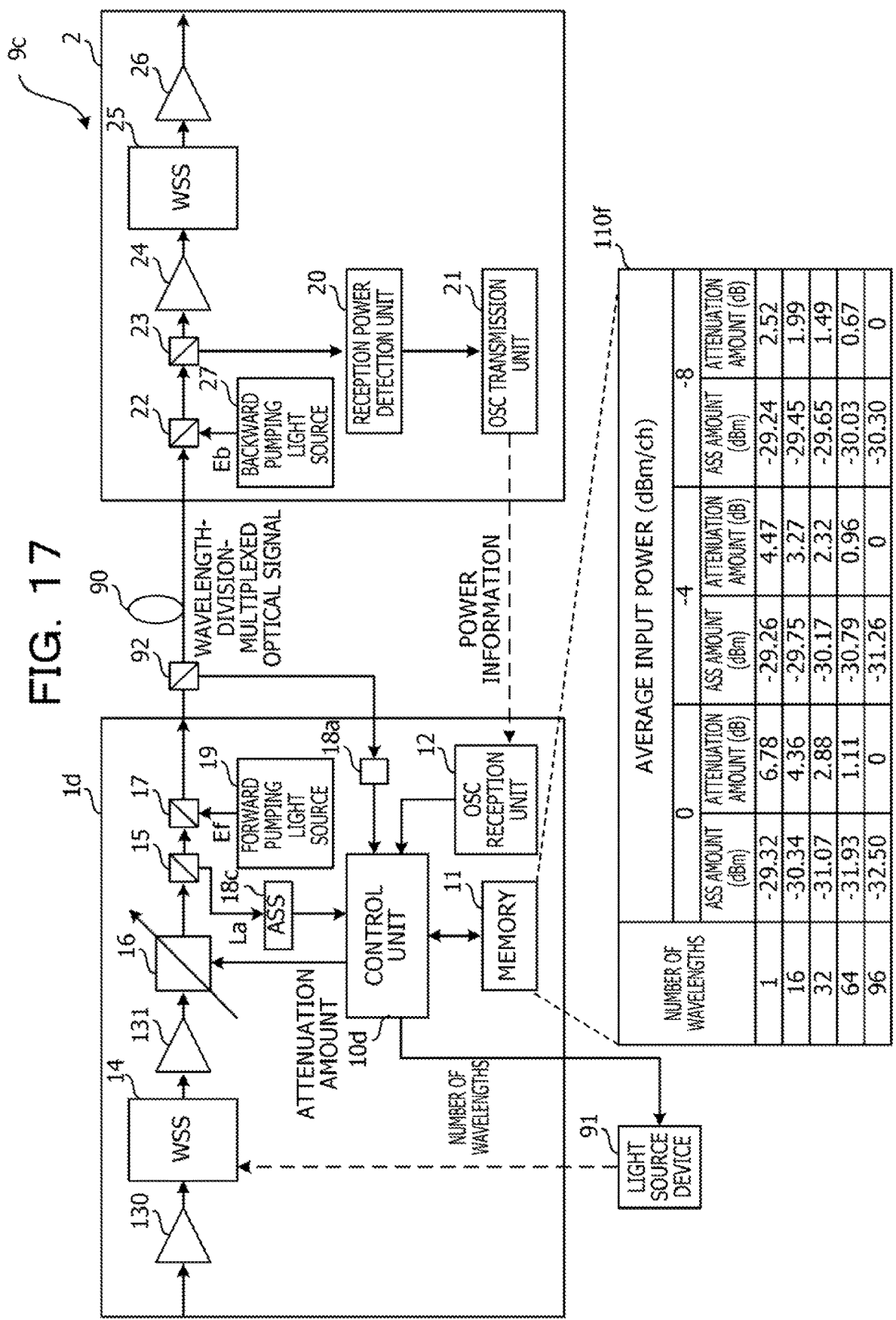
FIG. 17 is a diagram illustrating a transmission system in a sixth embodiment.

FIG. 17 is a diagram illustrating a transmission system 9c according to a sixth embodiment. In FIG. 17, configurations common to those in FIGS. 8 and 16 are denoted by the same reference signs as those in FIGS. 8 and 16 and description thereof is omitted.

The transmission system 9c includes a transmission device 1d that transmits the wavelength-division-multiplexed optical signal to the transmission line 90 and the reception device 2 that receives the wavelength-division-multiplexed optical signal from the transmission device 1d via the transmission line 90. The tap 92 is provided at the input end of the transmission line 90.

The transmission device 1d includes a control unit 10d, the memory 11, the OSC reception unit 12, the WSS unit 14, the tap 15, the variable optical attenuator 16, and the WDM coupler 17. The transmission device 1d also includes the pre-amplifier 130, the post-amplifier 131, the ASS detection unit 18c, the input power detection unit 18a, and the forward pumping light source 19.

The control unit 10d is, for example, a CPU circuit and executes a series of processes according to a program. The control unit 10d is not limited to the CPU circuit and may be, for example, a circuit formed of hardware such as an FPGA or an ASIC.

The control unit 10d obtains the detection value of the ASS amount from the ASS detection unit 18c as in the fifth embodiment, obtains the detection value of the input power from the input power detection unit 18a as in the second embodiment, and calculates the average input power per wavelength by dividing the detection value of the input power by the number of wavelengths. The control unit 10d also obtains the power information of the reception power from the reception device 2 via the OSC.

Before the start of the operation of the transmission system 9c, the control unit 10d generates a data table 110f from the measurement results of the ASS amount and the attenuation amount by the same method as that in the fifth embodiment, for each value of average input power (dBm/ch). In this case, the control unit 10a calculates the average input power by dividing the input power detected by the input power detection unit 18a by the number of wavelengths set in the light source device 91.

Combinations of the ASS amount and the attenuation amount corresponding to the respective numbers of wavelengths are registered in the data table 110f for each value of average input power. Examples of the average input power include, but are not limited to, 0 (dBm/ch), −4 (dBm/ch), and −8 (dBm/ch). The ASS amount corresponding to each number of wavelengths in the data table 110f varies depending on the average input power. The data table 110f is an example of the correlation data on the correlation between the ASS amount and the attenuation amount in the case where the reception power of the wavelength-division-multiplexed optical signal is the target value.

During the operation of the transmission system 9c, the control unit 10d determines the attenuation amount of the variable optical attenuator 16 from the ASS amount and the average input power, based on the data table 110f. For example, the control unit 10d determines the attenuation amount from the correlation between the ASS amount and the attenuation amount corresponding to the average input power.

In this case, the control unit 10d calculates the average input power by dividing the input power detected by the input power detection unit 18a by, for example, the number of wavelengths set by the network monitoring device or the like. The control unit 10d thus may set an appropriate attenuation amount corresponding to the average input power in the variable optical attenuator 16.

The control unit 10d may generate a mathematical formula indicating the correlation among the ASS amount, the average input power, and the attenuation amount by the same method as that described above, before the start of the operation of the transmission system 9c. In this case, the control unit 10d may store coefficients of the mathematical formula in the memory 11 and read the coefficients to use them for the determination of the attenuation amount during the operation of the transmission system 9c.

Seventh Embodiment

A data table on a correlation among the ASS amount, the attenuation amount, and the type of the transmission line 90 may be stored in the memory 11. The type of optical fiber is described as an example of the type of transmission line 90 as in the third embodiment. A transmission system in this embodiment has the same configuration as that in the fifth embodiment.

FIG. 18 illustrates a data table 110g in a seventh embodiment. The ASS amount, the attenuation amount, and the type of optical fiber in the case where the reception power is the target value are registered in the data table 110g. For example, the data table 110g indicates a correlation among the ASS amount, the attenuation amount, and the type of optical fiber. The data table 110g is an example of the correlation data.

Before the start of the operation of the transmission system 9b, the control unit 10c generates the data table 110g from the measurement results of the ASS amount and the attenuation amount by the same method as that in the fifth embodiment, for each type of optical fiber. Combinations of the ASS amount and the attenuation amount corresponding to the respective numbers of wavelengths are registered in the data table 110g for each type of optical fiber. The ASS amount corresponding to each number of wavelengths in the data table 110g varies depending on the type of optical fiber.

During the operation of the transmission system 9b, the control unit 10c determines the attenuation amount of the variable optical attenuator 16 from the ASS amount and the type of the optical fiber, based on the data table 110g. For example, the control unit 10c determines the attenuation amount from the correlation between the ASS amount and the attenuation amount corresponding to the type of the optical fiber.

In this case, the control unit 10c receives a notification of the type of optical fiber in the transmission line 90 from, for example, the network monitoring device or the like. The control unit 10c may thus set an appropriate attenuation amount corresponding to the type of optical fiber in the variable optical attenuator 16.

The control unit 10c may generate a mathematical formula indicating the correlation among the ASS amount, the type of optical fiber, and the attenuation amount by the same method as that described above, before the start of the operation of the transmission system 9b. In this case, the control unit 10c may store coefficients of the mathematical formula in the memory 11 and read the coefficients to use them for the determination of the attenuation amount during the operation of the transmission system 9b.

Eighth Embodiment

A data table on a correlation among the ASS amount, the attenuation amount, the average input power, and the type of optical fiber may be stored in the memory 11. In this embodiment, the average input power is calculated as in the second embodiment and the type of optical fiber is the same as that in the third embodiment. A transmission system in the present embodiment has the same configuration as that in the sixth embodiment.

FIGS. 19, 20, and 21 illustrate data tables 110h-1 to 110h-3 in an eighth embodiment. Although the data tables 110h-1 to 110h-3 are stored in the memory 11 as one data table, these data tables are illustrated as three separate tables for convenience.

The data table 110h-1 illustrates a correlation between the ASS amount and the attenuation amount for each value of average input power in the case where the type of optical fiber is SMF. The data table 110h-2 illustrates a correlation between the ASS amount and the attenuation amount for each value of average input power in the case where the type of optical fiber is DSF. The data table 110h-3 illustrates a correlation between the ASS amount and the attenuation amount for each value of average input power in the case where the type of optical fiber is ExtCORE.

The ASS amount, the attenuation amount, the average input power, and the type of optical fiber in the case where the reception power is the target value are registered in the data tables 110*h*-1 to 110*h*-3. For example, the data tables 110*h*-1 to 110*h*-3 indicate the correlation among the ASS amount, the attenuation amount, the average input power, and the type of optical fiber.

Before the start of the operation of the transmission system 9*c*, the control unit 10*d* generates the data tables 110*h*-1 to 110*h*-3 from the measurement results of the ASS amount and the attenuation amount by the same method as that in the fifth embodiment, for each combination of the average input power and the type of optical fiber. Combinations of the ASS amount and the attenuation amount corresponding to the respective numbers of wavelengths are registered in the data tables 110*h*-1 to 110*h*-3 for each combination of the average input power and the type of optical fiber. The data tables 110*h*-1 to 110*h*-3 are examples of the correlation data.

During the operation of the transmission system 9*c*, the control unit 10*d* determines the attenuation amount of the variable optical attenuator 16 from the ASS amount, the average input power, and the type of optical fiber, based on the data tables 110*h*-1 to 110*h*-3. For example, the control unit 10*d* determines the attenuation amount from the correlation between the ASS amount and the attenuation amount corresponding to the combination of the average input power and the type of optical fiber.

In this case, the control unit 10*d* receives a notification of the type of optical fiber in the transmission line 90 from, for example, the network monitoring device or the like. The control unit 10*d* may thus set an appropriate attenuation amount, corresponding not only to the average input power but also to the type of optical fiber, in the variable optical attenuator 16.

The control unit 10*d* may generate a mathematical formula indicating the correlation among the ASS amount, the average input power, the type of optical fiber, and the attenuation amount by the same method as that described above, before the start of the operation of the transmission system 9*c*. In this case, the control unit 10*d* may store coefficients of the mathematical formula in the memory 11 and read the coefficients to use them for the determination of the attenuation amount during the operation of the transmission system 9*c*.

The aforementioned embodiments are preferred embodiments of the present disclosure. However, the present disclosure is not limited to this and various modifications may be made within a scope not departing from the gist of the present disclosure.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A transmission device comprising:
   a signal power detection circuit that detects signal power of a wavelength-division-multiplexed optical signal to be transmitted to a transmission line into which pumping light is inputted from a Raman amplifier;
   a variable optical attenuator that attenuates the wavelength-division-multiplexed optical signal; and
   a control circuit that reduces, in response to an increase in the detected signal power, an attenuation amount of the variable optical attenuator.

2. The transmission device according to claim 1, further comprising
   a storage circuit that stores correlation data on a correlation between the signal power and the attenuation amount in a case where reception power of the wavelength-division-multiplexed optical signal received by an opposite device is a target value, the opposite device being on the opposite side of the transmission line to the transmission device, wherein
   the control circuit determines the attenuation amount of the variable optical attenuator from the signal power, based on the correlation data.

3. The transmission device according to claim 2, wherein the correlation data includes combinations of the signal power and the attenuation amount.

4. The transmission device according to claim 2, wherein the correlation data includes a coefficient of a mathematical formula indicating the correlation between the signal power and the attenuation amount.

5. The transmission device according to claim 2, wherein the control circuit sets the target value by using the reception power obtained in a case where the number of wavelengths included in the wavelength-division-multiplexed optical signal is a maximum value within a range that is settable for the transmission device.

6. The transmission device according to claim 2, further comprising
   an input power detection circuit that detects input power of the wavelength-division-multiplexed optical signal at an input end of the transmission line, wherein
   the correlation data is data on a correlation among the signal power, the attenuation amount, and an average value of the input power per wavelength in the case where the reception power is the target value, and
   the control circuit calculates the average value from the input power and determines the attenuation amount of the variable optical attenuator from the signal power and the average value, based on the correlation data.

7. The transmission device according to claim 6, wherein the correlation data is data on a correlation among the signal power, the attenuation amount, the average value, and a type of the transmission line in the case where the reception power is the target value, and
   the control circuit determines the attenuation amount of the variable optical attenuator from the signal power, the input power, and the type of transmission line, based on the correlation data.

8. The transmission device according to claim 2, wherein the correlation data is data on a correlation among the signal power, the attenuation amount, and a type of the transmission line in the case where the reception power is the target value, and
   the control circuit determines the attenuation amount of the variable optical attenuator from the signal power and the type of transmission line, based on the correlation data.

9. A transmission device comprising:
an amplified spontaneous Raman scattering (ASS) detection circuit that detects a generation amount of ASS light of a Raman amplifier configured to output pumping light to a transmission line of a wavelength-division-multiplexed optical signal;
a variable optical attenuator that attenuates the wavelength-division-multiplexed optical signal to be outputted to the transmission line; and
a control circuit that reduces, in response to a decrease in the detected generation amount of the ASS light, an attenuation amount of the variable optical attenuator.

10. The transmission device according to claim 9, further comprising
a storage circuit that stores correlation data on a correlation between the generation amount of the ASS light and the attenuation amount in a case where the reception power of the wavelength-division-multiplexed optical signal received by an opposite device is a target value, the opposite device being on the opposite side of the transmission line to the transmission device, wherein
the control circuit determines the attenuation amount of the variable optical attenuator from the generation amount of the ASS light, based on the correlation data.

11. A transmission system comprising:
a transmission device that transmits a wavelength-division-multiplexed optical signal to a transmission line into which pumping light is inputted from a Raman amplifier; and
a reception device that receives the wavelength-division-multiplexed optical signal from the transmission device via the transmission line, wherein
the transmission device includes
a signal power detection circuit that detects signal power of the wavelength-division-multiplexed optical signal to be transmitted through the transmission line,
a variable optical attenuator that attenuates the wavelength-division-multiplexed optical signal, and
a control circuit that reduces, in response to an increase in the detected signal power, an attenuation amount of the variable optical attenuator.

12. The transmission system according to claim 11, wherein
the transmission device includes a storage circuit that stores correlation data on a correlation between the signal power and the attenuation amount,
the reception device includes
a reception power detection circuit that detects reception power of the wavelength-division-multiplexed optical signal, and
a notification circuit that notifies the control unit of the reception power, and
the control circuit
controls the attenuation amount according to a change in the signal power depending on the number of wavelengths included in the wavelength-division-multiplexed optical signal to set the reception power to a target value,
generates the correlation data based on the signal power and the attenuation amount in a case where the reception power becomes the target value by the control, and
after the generation of the correlation data, determines the attenuation amount of the variable optical attenuator from the signal power, based on the correlation data.

13. A transmission system comprising:
a transmission device that transmits a wavelength-division-multiplexed optical signal to a transmission line into which pumping light is inputted from a Raman amplifier; and
a reception device that receives the wavelength-division-multiplexed optical signal from the transmission device via the transmission line, wherein
the transmission device includes
an amplified spontaneous Raman scattering (ASS) detection circuit that detects a generation amount of ASS light of the Raman amplifier,
a variable optical attenuator that attenuates the wavelength-division-multiplexed optical signal to be outputted to the transmission line, and
a control circuit that reduces, in response to a decrease in the detected generation amount of the ASS light, an attenuation amount of the variable optical attenuator.

14. The transmission system according to claim 13, wherein
the transmission device includes a storage circuit that stores correlation data on a correlation between the generation amount of the ASS light and the attenuation amount,
the reception device includes
a reception power detection circuit that detects reception power of the wavelength-division-multiplexed optical signal, and
a notification circuit that notifies the control circuit of the reception power, and
the control circuit
controls the attenuation amount according to a change in the generation amount of the ASS light depending on the number of wavelengths included in the wavelength-division-multiplexed optical signal to set the reception power to a target value,
generates the correlation data based on the generation amount of the ASS light and the attenuation amount in a case where the reception power becomes the target value by the control, and
after the generation of the correlation data, determines the attenuation amount of the variable optical attenuator from the generation amount of the ASS light, based on the correlation data.

* * * * *